US007822688B2

(12) United States Patent
Labrou et al.

(10) Patent No.: US 7,822,688 B2
(45) Date of Patent: Oct. 26, 2010

(54) WIRELESS WALLET

(75) Inventors: Yannis Labrou, Baltimore, MD (US); Lusheng Ji, Randolph, NJ (US); Jonathan Russell Agre, Brinklow, MD (US); Jesus Molina Terriza, Washington, DC (US); Wei-lun Chen, Greenbelt, MD (US)

(73) Assignee: Fujitsu Limited, Kawasaki (JP)

( * ) Notice: Subject to any disclaimer, the term of this patent is extended or adjusted under 35 U.S.C. 154(b) by 901 days.

(21) Appl. No.: 11/045,484

(22) Filed: Jan. 31, 2005

(65) Prior Publication Data

US 2005/0187873 A1 Aug. 25, 2005

Related U.S. Application Data

(63) Continuation-in-part of application No. 10/458,205, filed on Jun. 11, 2003, now Pat. No. 7,353,382, and a continuation-in-part of application No. 10/628,584, filed on Jul. 29, 2003, and a continuation-in-part of application No. 10/628,569, filed on Jul. 29, 2003, and a continuation-in-part of application No. 10/628,583, filed on Jul. 29, 2003.

(60) Provisional application No. 60/401,807, filed on Aug. 8, 2002, provisional application No. 60/544,300, filed on Feb. 17, 2004, provisional application No. 60/549,148, filed on Mar. 3, 2004, provisional application No. 60/575,835, filed on Jun. 2, 2004.

(51) Int. Cl.
*G06Q 20/00* (2006.01)

(52) U.S. Cl. .......................................... 705/67; 705/75

(58) Field of Classification Search .................... 705/59
See application file for complete search history.

(56) References Cited

U.S. PATENT DOCUMENTS 4,182,261 A 1/1980 Smith, III et al.

(Continued)

FOREIGN PATENT DOCUMENTS

CA 2291430 A1 * 7/2000

(Continued)

OTHER PUBLICATIONS

Menezes, Paul et al. "Handbook of Applied Cryptography" $5^{th}$ Edition (Aug. 2001), Copyright 1996 CRC Press, Chapter 9.78.*

(Continued)

*Primary Examiner*—Calvin L Hewitt, II
*Assistant Examiner*—James D Nigh
(74) *Attorney, Agent, or Firm*—Staas & Halsey LLP

(57) ABSTRACT

A mobile phone system and method of initializing, at a secure transaction server (STS), a mobile payment software with a software authentication parameter, as an authentic mobile payment software; providing an STS correlation between a personal identification entry (PIE) and the authentic mobile payment software; installing, in a mobile phone, the authentic mobile payment software; and inputting, by a user, the PIE to the installed authentic mobile payment software to generate according to the PIE and the software authentication parameter a transformed secure authenticable mobile phone cashless monetary transaction over the mobile phone network, as a mobile phone wireless wallet of the user of the mobile phone. The mobile phone authenticable cashless monetary transaction is performed according to an agreement view(s) protocol.

30 Claims, 15 Drawing Sheets

U.S. PATENT DOCUMENTS

| | | | |
|---|---|---|---|
| 4,253,086 A | 2/1981 | Szwarcbier | |
| 4,458,109 A | 7/1984 | Mueller-Schloer | |
| 4,582,985 A | 4/1986 | Lofberg | |
| 4,636,622 A | 1/1987 | Clark | |
| 4,882,195 A | 11/1989 | Butland | |
| 5,095,194 A | 3/1992 | Barbanell | |
| 5,194,289 A | 3/1993 | Butland | |
| 5,239,166 A | 8/1993 | Graves | |
| 5,256,863 A | 10/1993 | Ferguson et al. | |
| 5,363,453 A | 11/1994 | Gagne et al. | |
| 5,465,328 A | 11/1995 | Dievendorff et al. | |
| 5,485,312 A | 1/1996 | Horner et al. | |
| 5,521,980 A | 5/1996 | Brands | |
| 5,598,474 A | 1/1997 | Johnson | |
| 5,631,961 A | 5/1997 | Mills et al. | |
| 5,644,118 A | 7/1997 | Hayashida | |
| 5,666,420 A | 9/1997 | Micali | |
| 5,732,148 A | 3/1998 | Keagy et al. | |
| 5,790,677 A | 8/1998 | Fox et al. | |
| 5,794,204 A | 8/1998 | Miyazawa et al. | |
| 5,869,822 A | 2/1999 | Meadows, II et al. | |
| 5,913,203 A * | 6/1999 | Wong et al. | 705/39 |
| 5,917,168 A | 6/1999 | Nakamura et al. | |
| 5,949,043 A | 9/1999 | Hayashida | |
| 5,956,404 A | 9/1999 | Schneier et al. | |
| 6,003,762 A | 12/1999 | Hayashida | |
| 6,003,767 A | 12/1999 | Hayashida | |
| 6,006,328 A | 12/1999 | Drake | |
| 6,010,068 A | 1/2000 | Bozzo | |
| 6,032,258 A | 2/2000 | Godoroja et al. | |
| 6,044,388 A | 3/2000 | DeBellis et al. | |
| 6,067,621 A | 5/2000 | Yu et al. | |
| 6,069,969 A | 5/2000 | Keagy et al. | |
| 6,081,793 A | 6/2000 | Challener et al. | |
| 6,098,053 A | 8/2000 | Slater | |
| 6,115,601 A | 9/2000 | Ferreira | |
| 6,137,884 A | 10/2000 | Micali | |
| 6,163,771 A | 12/2000 | Walker et al. | |
| 6,175,922 B1 | 1/2001 | Wang | |
| 6,175,923 B1 | 1/2001 | Bailey | |
| 6,182,892 B1 | 2/2001 | Angelo et al. | |
| 6,199,099 B1 | 3/2001 | Gershman et al. | |
| 6,212,290 B1 | 4/2001 | Gagne et al. | |
| 6,226,752 B1 | 5/2001 | Gupta et al. | |
| 6,257,487 B1 | 7/2001 | Hayashida | |
| 6,263,436 B1 | 7/2001 | Franklin et al. | |
| 6,270,011 B1 | 8/2001 | Gottfried | |
| 6,334,575 B1 | 1/2002 | Su-Hui | |
| 6,356,752 B1 | 3/2002 | Griffith | |
| 6,366,893 B2 | 4/2002 | Hannula et al. | |
| 6,367,010 B1 | 4/2002 | Venkatram | |
| 6,377,692 B1 | 4/2002 | Takahashi et al. | |
| 6,378,073 B1 | 4/2002 | Davis | |
| 6,378,775 B2 | 4/2002 | Hayashida | |
| 6,405,314 B1 | 6/2002 | Bailey | |
| 6,435,406 B1 | 8/2002 | Pentel | |
| 6,470,448 B1 | 10/2002 | Kuroda et al. | |
| 6,512,919 B2 * | 1/2003 | Ogasawara | 455/422.1 |
| 6,529,885 B1 | 3/2003 | Johnson | |
| 6,556,875 B1 | 4/2003 | Nagasaka et al. | |
| 6,587,684 B1 * | 7/2003 | Hsu et al. | 455/419 |
| 6,598,032 B1 | 7/2003 | Challener et al. | |
| 6,687,375 B1 | 2/2004 | Matyas et al. | |
| 6,715,679 B1 | 4/2004 | Infosino | |
| 6,766,453 B1 | 7/2004 | Nessett et al. | |
| 6,775,777 B2 | 8/2004 | Bailey | |
| 6,817,521 B1 | 11/2004 | Matada | |
| 6,874,029 B2 * | 3/2005 | Hutcheson et al. | 709/227 |
| 6,915,951 B2 * | 7/2005 | Hayashida | 235/379 |
| 6,926,200 B1 * | 8/2005 | Hayashida | 235/379 |
| 6,931,431 B2 | 8/2005 | Cachin et al. | |
| 6,957,334 B1 | 10/2005 | Goldstein et al. | |
| 6,985,583 B1 | 1/2006 | Brainard et al. | |
| 7,003,499 B2 | 2/2006 | Arditti et al. | |
| 7,025,256 B1 * | 4/2006 | Drummond et al. | 235/379 |
| 7,089,208 B1 * | 8/2006 | Levchin et al. | 705/39 |
| 7,099,471 B2 | 8/2006 | Neff | |
| 7,167,844 B1 | 1/2007 | Leong et al. | |
| 7,181,017 B1 | 2/2007 | Nagel et al. | |
| 7,200,749 B2 | 4/2007 | Wheeler et al. | |
| 7,239,346 B1 | 7/2007 | Priddy | |
| 7,379,916 B1 * | 5/2008 | Mizrah | 705/44 |
| 7,427,033 B1 | 9/2008 | Roskind | |
| 7,578,436 B1 | 8/2009 | Kiliccote | |
| 2001/0004231 A1 | 6/2001 | Bailey | |
| 2001/0005840 A1 * | 6/2001 | Verkama | 705/67 |
| 2001/0010723 A1 | 8/2001 | Pinkas | |
| 2001/0034670 A1 | 10/2001 | Blair | |
| 2001/0037254 A1 | 11/2001 | Glikman | |
| 2001/0037264 A1 | 11/2001 | Husemann et al. | |
| 2001/0045458 A1 | 11/2001 | Polansky | |
| 2001/0053239 A1 | 12/2001 | Takhar | |
| 2002/0017561 A1 | 2/2002 | Tomoike | |
| 2002/0018585 A1 | 2/2002 | Kim | |
| 2002/0052841 A1 * | 5/2002 | Guthrie et al. | 705/40 |
| 2002/0057803 A1 * | 5/2002 | Loos et al. | 380/270 |
| 2002/0073024 A1 | 6/2002 | Gilchrist | |
| 2002/0077885 A1 | 6/2002 | Karro et al. | |
| 2002/0077974 A1 | 6/2002 | Ortiz | |
| 2002/0077993 A1 | 6/2002 | Immonen et al. | |
| 2002/0082925 A1 | 6/2002 | Herwig | |
| 2002/0087534 A1 | 7/2002 | Blackman et al. | |
| 2002/0087869 A1 | 7/2002 | Kim | |
| 2002/0095296 A1 | 7/2002 | Hind et al. | |
| 2002/0095570 A1 | 7/2002 | Eldridge et al. | |
| 2002/0097867 A1 | 7/2002 | Bartram | |
| 2002/0107007 A1 | 8/2002 | Gerson | |
| 2002/0107791 A1 | 8/2002 | Nobrega | |
| 2002/0107939 A1 | 8/2002 | Ford et al. | |
| 2002/0141575 A1 * | 10/2002 | Hird | 380/44 |
| 2002/0163421 A1 | 11/2002 | Wang et al. | |
| 2002/0174336 A1 | 11/2002 | Sakakibara | |
| 2002/0176579 A1 | 11/2002 | Deshpande et al. | |
| 2002/0196944 A1 | 12/2002 | Davis et al. | |
| 2003/0046541 A1 | 3/2003 | Gerdes et al. | |
| 2003/0061486 A1 | 3/2003 | Shibuya et al. | |
| 2003/0123667 A1 * | 7/2003 | Weber et al. | 380/277 |
| 2003/0174049 A1 * | 9/2003 | Beigel et al. | 340/10.42 |
| 2003/0190046 A1 | 10/2003 | Kamerman et al. | |
| 2003/0204726 A1 | 10/2003 | Kefford et al. | |
| 2003/0226030 A1 | 12/2003 | Hurst et al. | |
| 2004/0030894 A1 | 2/2004 | Labrou et al. | |
| 2004/0104268 A1 | 6/2004 | Bailey | |
| 2004/0123098 A1 | 6/2004 | Chen et al. | |
| 2004/0123159 A1 * | 6/2004 | Kerstens et al. | 713/202 |
| 2004/0151323 A1 | 8/2004 | Olkin et al. | |
| 2004/0153649 A1 | 8/2004 | Rhoads | |
| 2004/0158492 A1 * | 8/2004 | Lopez et al. | 705/14 |
| 2004/0234117 A1 | 11/2004 | Tibor | |
| 2005/0067485 A1 | 3/2005 | Caron | |
| 2005/0122209 A1 | 6/2005 | Black | |
| 2005/0194452 A1 | 9/2005 | Nordentoft et al. | |
| 2006/0004862 A1 * | 1/2006 | Fisher et al. | 707/104.1 |
| 2006/0229988 A1 | 10/2006 | Oshima et al. | |
| 2006/0266823 A1 | 11/2006 | Passen et al. | |

FOREIGN PATENT DOCUMENTS

| | | |
|---|---|---|
| DE | 2 386 236 | 9/2003 |
| DE | 103 10 527 A1 | 9/2004 |
| EP | 0950968 | 2/1999 |
| EP | 0 982 674 A2 | 3/2000 |
| EP | 1 120 761 A2 | 8/2001 |
| EP | 1 178 444 A1 | 2/2002 |

| | | | |
|---|---|---|---|
| EP | 1 231 578 | A2 | 8/2002 |
| EP | 1 237 132 | A2 | 9/2002 |
| EP | 1 237 133 | A2 | 9/2002 |
| EP | 1 237 134 | A2 | 9/2002 |
| EP | 1 388 797 | A2 | 2/2004 |
| JP | 2000-36000 | | 2/2000 |
| JP | 2000-207483 | | 7/2000 |
| JP | 2000-269957 | | 9/2000 |
| JP | 2001-147984 | | 5/2001 |
| JP | 2001-331755 | | 11/2001 |
| JP | 2002-215027 | | 7/2002 |
| JP | 2002-259621 | | 9/2002 |
| KR | 2000-0068758 | | 11/2000 |
| WO | WO 97-41932 | | 11/1997 |
| WO | WO 97-45814 | | 12/1997 |
| WO | WO 98/25371 | | 6/1998 |
| WO | WO 98/37524 | | 8/1998 |
| WO | WO 00/46959 | | 8/2000 |
| WO | WO 01/01361 | | 1/2001 |
| WO | WO 01-35570 | | 5/2001 |
| WO | WO 01/80133 | | 10/2001 |
| WO | WO 01/98854 | | 12/2001 |
| WO | WO 02/07117 | | 1/2002 |
| WO | WO 02/11082 | | 2/2002 |
| WO | WO 02/13151 | | 2/2002 |
| WO | WO 02/27421 | | 4/2002 |
| WO | WO 02/27439 | | 4/2002 |
| WO | WO 02/29708 | | 4/2002 |
| WO | WO 02/29739 | | 4/2002 |
| WO | WO02/41271 | | 5/2002 |
| WO | WO 02/43020 | | 5/2002 |
| WO | WO 02/054655 | | 7/2002 |
| WO | WO 02-59849 | | 8/2002 |
| WO | WO 02/067534 | | 8/2002 |

OTHER PUBLICATIONS

Steves, Douglas. "Overview on Secure Transaction Protocols" http://www.usenix.org/publications/library/proceedings/ec96/full__papers/steves/html/node5.html#SECTION 00021000000000000000.*

Iyer (UNIX and Internet Security, Department of Computer Science and Engineering, Indian Institute of Technology, Mar. 1997, 38 pages).*

Herschberg, Mark A., "Secure Electronic Voting Over the World Wide Web," Massachusetts Institute of Technology, May 27, 1997 (pp. 1-67).

Jan et al., "The Design of Protocol for e-Voting on the Internet." IEEE, Oct. 2001 (pp. 180-189).

Jan, Jinn-ke et al. "A secure anonymous voting protocol with a complete supervision." Computer Systems Science & Engineering, vol. 17, Nos. (4/5): Jul./Sep. 2002 (pp. 213-221).

Juang, Wen-Sheng et al. "A Verifiable Multi-Authorities Secret Election Allowing Abstaining from Voting." International Computer Symposium, Tainan, Taiwan, 1998 (pp. 1-21).

Menezes, Alfred J. et al., "Handbook of Applied Cryptography", 1997 CRC Press LLC, Section 1.5 Symmetric-key encryption, (9 pages).

Summons to Attend Oral Proceedings; Annex to the Summons Preliminary Opinion of the Examining Division issued on Mar. 12, 2008 by the European Patent Office in the related European Patent Application No. 03254927.1-1238 (10 pages).

Deborah Bach, "CIBC Makes Long-Term Case for Wireless" [online], American Banker, vol. 167, No. 65, Apr. 5, 2002 (2 pages) [retrieved on Aug. 2, 2002]. Retrieved from the Internet: <URL: http://www.nerac.com>.

"WAWA Installs Wireless Card Processing" [online], CardLine, 2001 (1 page) [retrieved on Aug. 2, 2002]. Retrieved from the Internet: <URL: http://www.nerac.com>.

Jennifer A. Kingson, "First Data Sets Strategy for Wireless" [online], American Banker, vol. 167, No. 17, Jan. 25, 2002 (3 pages) [retrieved on Aug. 2, 2002]. Retrieved from the Internet: <URL: http://www.nerac.com>.

"Thirsty? Soon you may be able to charge and chug" [online], USA Today, Dec. 21, 2001, p. 7B (1 page) [retrieved on Aug. 2, 2002]. Retrieved from the Internet: <URL: http://www.nerac.com>.

M. Giometti, et al., "Creating Winning M-Commerce Models in the Financial Services" [online], FutureBanker, vol. 5, No. 10, Dec. 2001, p. 37 (2 page) [retrieved on Aug. 2, 2002]. Retrieved from the Internet: <URL: http://www.nerac.com>.

"Hongkong Post Launches Mobile e-Certs" [online], Online Reporter, Oct. 22, 2001 (2 page) [retrieved on Aug. 2, 2002]. Retrieved from the Internet: <URL: http://www.nerac.com>.

"Wallet and WIM pilot" [online], Mobile Europe, Oct. 2001, p. 16 (1 page) [retrieved on Aug. 2, 2002]. Retrieved from the Internet: <URL: http://www.nerac.com>.

"Regional News: Asia/Pacific: DoCoMo, Sony Use E-Purse, PDAs In Mobile Commerce Trial" [online]. Card Technology, vol. 2, No. 10, Oct. 2001 (1 page) [retrieved on Aug. 2, 2002]. Retrieved from the Internet: <URL: http://www.nerac.com>.

"Wildcard Sure Mobile Pizza Pilot Will Deliver" [online]. CardLine, Oct. 2001 (1 page) [retrieved on Aug. 2, 2002]. Retrieved from the Internet: <URL: http://www.nerac.com>.

Varshney, Upkar, et al., "Mobile commerce: Framework, applications and networking support" [online]. Mobile Networks Appl., vol. 7, No. 3, Jun. 2002, pp. 185-198 (1 page) [retrieved on Aug. 2, 2002]. Retrieved from the Internet: <URL: http://www.nerac.com>.

Friis-Hansen, et al., "Secure electronic transactions—The mobile phone evolution continues" [online]. Ericsson Rev. (Engl. Ed); vol. 78, No. 4, 2001, pp. 162-167 (1 page) [retrieved on Aug. 2, 2002]. Retrieved from the Internet: <URL: http://www.nerac.com>.

Bettstetter, Christian, et al., "(Auto) mobile communication in a heterogeneous and converged world" [online]. IEEE Pers Commun., vol. 8, No. 6, Dec. 2001, pp. 41-47 (1 page) [retrieved on Aug. 2, 2002]. Retrieved from the Internet: <URL: http://www.nerac.com>.

Gupta, S., "Securing the wireless internet" [online]. IEEE Commun. Mag., vol. 39, No. 12, Dec. 2001, pp. 68-75 (1 page) [retrieved on Aug. 2, 2002]. Retrieved from the Internet: <URL: http://www.nerac.com>.

Aalders, K., "Travel card: Airport self-check in using a wireless PDA" [online]. IEEE Conf. Intell Transport Syst Proc ITSC, 2001, pp. 1224-1228 (1 page) [retrieved on Aug. 2, 2002]. Retrieved from the Internet: <URL: http://www.nerac.com>.

Brananaghan, R.J., "Human factors issues in the design of handheld wireless devices" [online]. Proc SPIE Int Soc Opt Eng, vol. 4428, 2001, pp. 37-41 (1 page) [retrieved on Aug. 2, 2002]. Retrieved from the Internet: <URL: http://www.nerac.com>.

Cohn, Michael, Like money in your hand: Wireless technology lets financial firms quickly deliver transactions and trades. (Financial Services) [online]. Internet World, vol. 8, No. 5, May 1, 2002, pp. 54(3) (4 pages). [retrieved on Aug. 2, 2002]. Retrieved from the Internet: <URL: http://www.nerac.com>.

Ray Cammack Shows. (M&S News). (to use wireless credit card terminals) (Brief Article) [online]. Amusement Business, vol. 114, No. 17, Apr. 29, 2002, pp. 4(1) (1 page) [retrieved on Aug. 2, 2002]. Retrieved from the Internet: <URL: http://www.nerac.com>.

Kabaher, April, MasterCard snags citi exec for new wireless role. (Brief Article) [online]. Financial Net News, vol. 7, No. 14, Apr. 8, 2002, pp. 1(2) (1 page) [retrieved on Aug. 2, 2002]. Retrieved from the Internet: <URL: http://www.nerac.com>.

"Pepsi North America tests wireless vending in Memphis" [online]. Automatic Merchandiser, vol. 44, No. 2, Feb. 1, 2002, pp. 9(1) (1 page) [retrieved on Aug. 2, 2002]. Retrieved from the Internet: <URL: http://www.nerac.com>.

Radding, Alan, "Crossing the Wireless Security Gap." [online]. Computerworld, Jan. 1, 2001 (3 pages) [retrieved on Aug. 2, 2002]. Retrieved from the Internet: <URL: http://www.nerac.com>.

Commerciant inks wireless deal. (EDS will provide transaction processing services for Commerciant's wireless terminals) (Brief Article) [online]. Houston Business Journal, vol. 32, No. 23, Oct. 19, 2001 (1 page) [retrieved on Aug. 2, 2002]. Retrieved from the Internet: <URL: http://www.nerac.com>.

"Wireless in Boston (Fleet HomeLink offers services through personal digital assistants) (Brief Article)" [online]. Bank Marketing, vol. 33, No. 7, Sep. 1, 2001 (1 page) [retrieved on Aug. 2, 2002]. Retrieved from the Internet: <URL: http://www.nerac.com>.

Murphy, Patricia A., Wireless payment technology spreads from gas pump to store. (VeriFone system) [online]. Stores, vol. 83, No. 5, May 1, 2001, pp. 74(2) (1 page) [retrieved on Aug. 2, 2002]. Retrieved from the Internet: <URL: http://www.nerac.com>.

Hoffman, Karen Epper, New Options in Wireless Payments. (Company Business and Marketing) [online]. Internet World, vol. 7, No. 7, Apr. 1, 2001, pp. 37 (4 pages) [retrieved on Aug. 2, 2002]. Retrieved from the Internet: <URL: http://www.nerac.com>.

Khachtchanski, V.I., et al., "Universal SIM toolkit-based client for mobile authorization system" [online]. Third International Conference on Information Integration and Web-based Applications and Services, 2001, pp. 337-344 (1 page) [retrieved on Aug. 2, 2002]. Retrieved from the Internet: <URL: http://www.nerac.com>.

"CIBC kicks off wireless banking service" [online]. Bank Systems + Technology, vol. 39, No. 5, May 2002, p. 12 (1 page) [retrieved on Aug. 2, 2002]. Retrieved from the Internet: <URL: http://www.nerac.com>.

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

Electronic payment systems, involving mobile phones (list of e-products, 15 listings), [online] Electronic Payment System Observatory (the ePSO website aims to monitor the progress of retail payment innovation throughout Europe, ePSO inventory of E-Payment services—List of e-products) (26 pages). European Central Bank, Frankfurt, Germany, 2002 [retrieved Sep. 11, 2002]. Retrieved from the Internet: <http:epso.intrasoft.lu>,.

Yannis Labrou, et al., "Wireless Wallet", Proceedings of the First Annual International Conference on Mobile and Ubiquitous Systems: Networking and Services (MobiQuitous '04); ISBN: 0-7695-2208-4, IEEE, Aug. 22, 2004.

Mobile, Academic Press Dictionary of Science and Technology, xreferplus (1992); http://xreferplus.com/entry.jsp?xrefid=3130947&secid=.&hh=1.

Purchase, 1996, Merriam-Webster's Dictionary of Law, http://dictionary.reference.com/browse/pruchase, p. 4.

U.S. Appl. No. 60/401,807, filed Aug. 8, 2002, Yannis Labrou, et al., Fujitsu Limited Kawasaki, Japan.

U.S. Appl. No. 10/458,205, filed Jun. 11, 2003, Yannis Labrou, et al., Fujitsu Limited Kawasaki, Japan.

U.S. Appl. No. 10/628,584, filed Jul. 29, 2003, Yannis Labrou, et al., Fujitsu Limited Kawasaki, Japan.

U.S. Appl. No. 10/628,569, filed Jul. 29, 2003, Yannis Labrou, et al., Fujitsu Limited Kawasaki, Japan.

U.S. Appl. No. 10/628,583, filed Jul. 29, 2003, Yannis Labrou, et al., Fujitsu Limited Kawasaki, Japan.

U.S. Appl. No. 60/544,300, filed Feb. 17, 2004, Yannis Labrou, et al., Fujitsu Limited Kawasaki, Japan.

U.S. Appl. No. 60/669,375, filed Apr. 8, 2005, Yannis Labrou, et al., Fujitsu Limited Kawasaki, Japan.

U.S. Appl. No. 11/041,223, filed Jan. 25, 2005, Yannis Labrou, et al., Fujitsu Limited Kawasaki, Japan.

U.S. Appl. No. 60/703,862, filed Aug. 1, 2005, Yannis Labrou, et al., Fujitsu Limited Kawasaki, Japan.

U.S. Appl. No. 11/388,202, filed Mar. 24, 2006, Yannis Labrou, et al., Fujitsu Limited Kawasaki, Japan.

U.S. Appl. No. 11/488,178, filed Jul. 18, 2006, Yannis Labrou, et al., Fujitsu Limited Kawasaki, Japan.

U.S. Appl. No. 60/541,903, filed Feb. 6, 2004, Yannis Labrou, et al., Fujitsu Limited Kawasaki, Japan.

U.S. Appl. No. 60/549,148, filed Mar. 3, 2004, Yannis Labrou, et al., Fujitsu Limited Kawasaki, Japan.

U.S. Appl. No. 60/575,835, filed Jun. 2, 2004, Yannis Labrou, et al., Fujitsu Limited Kawasaki, Japan.

PCT International Search Report dated Oct. 4, 2005 for International Application No. PCT/US05/04049 related to the above-identified present pending US patent application (2 pages).

Form PCT/ISA/237—Written Opinion of the International Searching Authority dated Oct. 4, 2005 in International Application No. PCT/US05/04049 related to the above-identified present pending US patent application (3 pages).

International Preliminary Report on Patentability (Chapter I of the Patent Cooperation Treaty) dated Aug. 22, 2006 in International Application No. PCT/US05/04049 related to the above-identified present pending US patent application (5 pages).

European Communication Pursuant to Article 96(2) EPC dated Jul. 26, 2005 in European Application No. 03 254 927.1-1238, related to the above-identified present pending US patent application (6 pages).

European Search Report Communication issued by the European Patent Office on Aug. 30, 2004 in European Application No. 03254927.1-1238 related to the above-identified present pending US patent application (3 pages).

European Search Report Communication issued by the European Patent Office on Jan. 8, 2007 in Application No. 06253923.4-1238 related to the above-identified present pending US patent application (13 pages).

Nerac (Patents, Intellectual Property, Research), [online]. Nerac, Inc. Tolland CT, USA, 4 pages [retrieved Dec. 18, 2006]. Retrieved from the Internet: <URL: http://www.nerac.com>.

MeT Mobile electronic Transactions (MeT limited is a company founded to establish a framework for secure mobile transactions) [online]. Mobile electronic Transactions Limited, 2003, 3 pages [retrieved Jan. 5, 2005]. Retrieved from the Internet: <URL: http://www.mobiletransaction.org>.

Two-Factor Token Matrix [online]. Diversinet Corp., 2 pages [retrieved on Mar. 24, 2006]. Retrieved from the Internet: <URL: http://www.diversinet.com/>.

Diversinet Delivers Consumer-Ready Soft Token Strong Authentication Solution [online]. Diversinet Corp., Feb. 7, 2006, 2 pages [retrieved on Dec. 27, 2006]. Retrieved from the Internet: <URL: http://www.diversinet.com/html/press/2006/consumer.html>.

Labrou, Yannis, Re: Mobile payments with a downloadable application from PayWi (referencing "PayWi Powers Personal Payments in Your Palm," PRNewswire, Portland Oregon, Feb. 6, 2006) [online]. Feb. 21, 2006 (4 pages) [retrieved Mar. 24, 2006]. Retrieved from the Internet: <URL: http://uptf.blogspot.com/2006/02/mobile-payments-with-downloadable.html>.

Labrou, Yannis. UPTF blog (a blog for Wireless Wallet) [online]22 pages [retrieved Dec. 27, 2006] Retrieved from the Internet: <URL: http://uptf.blogspot.com>.

Electronic Payment System Observatory (the ePSO website aims to monitor the progress of retail payment innovation throughout Europe, ePSO inventory of E-Payment services—List of e-products) [online]. European Central Bank, Frankfurt, Germany (3 pages) [retrieved Dec. 18, 2006]. Retrieved from the Internet: <URL: http://epso.intrasoft.lu>.

"Via Licensing Begins Process to Form Wireless Networking Patent Licensing Pool" [online]. Via Licensing Corporation, Oct. 23, 2003, 3 pages [retrieved Nov. 17, 2003]. Retrieved from the Internet: <URL: http://www.vialicensing.com/news/details.cfm?VIANEWS_ID=308>.

Labrou, Yannis, 'Re: Motorola's M-Wallet: Mobile payments with a J2ME application' (referencing "Motorola M-Wallet Solution" brochure Motorola, Inc. 2006) In UPTF blog for Wireless Wallet [online], Feb. 21, 2006, 5 pages [retrieved Mar. 24, 2006]. Retrieved from the Internet: <URL: http://uptf.blogspot.com/2006/02/mobile-payment-with-downloadable.html>.

IEEE Standards Association (IEEE Std 802.11 and amendments) (802.11 patent information) [online]. IEEE-SA, 19 pages [retrieved Dec. 27, 2006]. Retrieved from the Internet: <URL: http://standards.ieee.org/db/patents/pat802_11.html>.

European Search Report Communication issued by the European Patent Office on Apr. 23, 2007 in Application No. 06251957.4-1244 related to the above-identified present pending US patent application (9 pages).

Asthana, Abhaya, et al., An Indoor Wireless System for Personalized Shopping Assistance (1994) [online]. IEEE Workshop on Mobile Computing Systems and Applications (1 page Abstract) [retrieved on Aug. 2, 2002]. Retrieved from the Internet: <URL: http://www.nerac.com>.

European Search Report Communication issued by the European Patent Office on Nov. 15, 2007 in the related European Patent Application No. 03254926.3-1244 (3 pages).

Korean Office Action issued by the Korean Intellectual Property Office on Nov. 8, 2007 in related Korean Patent Application No. 10-2006-7019071 based upon PCT/US2005/004049 (4 pages) (English translation consisting of 4 pages).
Written Decision to Refuse European Patent Application of the Examining Division dated Apr. 28, 2009 in related corresponding European Application No. 03 254 927.1-1238 (14 pages).
European Communication Pursuant to Article 94(3) EPC dated May 19, 2009 in European Application No. 03 254 926.3-2413, related to the above-identified present pending US patent application (7 pages).
European Search Report Communication issued by the European Patent Office on Nov. 15, 2007 in the related European Patent Application No. 03254926.3-1244 (3 pages).
Japanese Office Action Mailed Jul. 14, 2009 issued in corresponding Japanese Application No. 2006-554126. (6 pages) (translation 8 pages).
U.S. Office Action mailed May 3, 2007 in co-pending U.S. Appl. No. 10/628,569 (10 pages).
U.S. Office Action mailed Oct. 19, 2007 in co-pending U.S. Appl. No. 10/628,569 (10 pages).
U.S. Advisory Action mailed Feb. 28, 2008 in co-pending U.S. Appl. No. 10/628,569 (2 pages).
U.S. Office Action mailed Jun. 26, 2008 in co-pending U.S. Appl. No. 10/628,569 (15 pages).
U.S. Interview Summary mailed Oct. 14, 2008 in co-pending U.S. Appl. No. 10/628,569 (2 pages).
U.S. Office Action mailed Apr. 2, 2009 in co-pending U.S. Appl. No. 10/628,569 (19 pages).
U.S. Office Action mailed Sep. 27, 2006 in U.S. Appl. No. 10/628,584 (now U.S. Patent No. 7,349,871) (16 pages).
U.S. Office Action mailed Apr. 19, 2007 in U.S. Appl. No. 10/628,584 (now U.S. Patent No. 7, 349,871) (21 pages).
U.S. NOA mailed Oct. 1, 2007 in U.S. Appl. No. 10/628,584 (now U.S. Patent No. 7, 349,871) (31 pages).
U.S. Supplemental Notice of Allowability mailed Jan. 9, 2008 in U.S. Appl. No. 10/628,584 (now U.S. Patent No, 7, 349,871) (12 pages).
U.S. Response to Rule 312 Communication mailed Feb. 12, 2008 in U.S. Appl. No. 10/628,584 (now U.S. Patent No. 7, 349,871) (7 pages).
U.S. Office Action mailed Mar. 5, 2008 in co-pending U.S. Appl. No. 11/041,223 (14 pages).
U.S. Office Action mailed Oct. 17, 2008 in co-pending U.S. Appl. No. 11/041,223 (20 pages).
U.S. Office Action mailed Apr. 2, 2009 in co-pending U.S. Appl. No. 11/041,223 (19 pages).
U.S. Office Action mailed Jul. 16, 2008 in co-pending U.S. Appl. No. 11/388,202 (6 pages).
U.S. Office Action mailed Oct. 1, 2008 in co-pending U.S. Appl. No. 11/388,202 (25 pages).
U.S. NOA mailed Jun. 1, 2009 in co-pending U.S. Appl. No. 11/388,202 (32 pages).
U.S. Supplemental Action Notice of Allowability mailed Jun. 18, 2009 in co-pending U.S. Appl. No. 11/388,202 (3 pages).
U.S. Office Action mailed Jan. 5, 2007 in U.S. Appl. No. 10/458,205 (now U.S. Patent No. 7,353,382) (11 pages).
U.S. Office Action mailed May 22, 2007 in U.S. Appl. No. 10/458,205 (now U.S. Patent No. 7,353,382) (12 pages).
U.S. NOA mailed Oct. 29, 2007 in U.S. Appl. No. 10/458,205 (now U.S. Patent No. 7,353,382) (9 pages).
U.S. Office Action mailed Mar. 8, 2007 in co-pending U.S. Appl. No. 10/628,583 (29 pages).
U.S. Office Action mailed Dec. 27, 2007 in co-pending U.S. Appl. No. 10/628,583 (49pages).
U.S. Advisory Action mailed Apr. 17, 2008 in co-pending U.S. Appl. No. 10/628,583 (8 pages).
U.S. Office Action mailed Jul. 2, 2008 in co-pending U.S. Appl. No. 10/628,583 (18 pages).
U.S. Interview Summary mailed Oct. 8, 2008 in co-pending U.S. Appl. No. 10/628,583 (18 pages).
U.S. Office Action mailed Mar. 16, 2009 in co-pending U.S. Appl. No. 10/628,583 (18 pages).
U.S. Office Action mailed Aug. 31, 2009 in co-pending U.S. Appl. No. 10/628,583 (16 pages).
US Office Action mailed Oct. 14, 2009 in copending U.S. Appl. No. 11/041,223.
US Office Action mailed Oct. 21, 2009 in copending U.S. Appl. No. 11/488,178.
Notice of Allowance mailed May 19, 2010 in realted co-pending U.S. Appl. No. 10/628,583.
U.S. Office Action mailed Mar. 31, 2010 in co-pending U.S. Appl. No. 11/041,223.
Japanese Office Action Mailed Jan. 19, 2010 in related Japanese Application No. 2003-289408 (4 pages).
European Communication Pursuant to Article 94(3) EPC dated Nov. 19, 2009 in European Application No. 06 251 957.4-1244, related to the above-identified present pending U.S. patent application (4 pages).
First Notification of Office action issued by the State Intellectual Property Office of China on Nov. 13, 2009 in related Chinese Patent Application No. 200610109167.7, related to the above-identified present pending US patent application (3 pages) English Translation (7 pages).
Japanese Office Action mailed on Oct. 20, 2009 in related Japanese Patent Application No. 2005-554126 (4 pages); English Translation (5 pages).
U.S. Notice of Allowance mailed Mar. 22, 2010 in co-pending U.S. Appl. No. 11/488,178.
U.S. Office Action mailed Oct. 21, 2009 in co-pending U.S. Appl. No. 11/488,178.
U.S. Office Action mailed Jun. 23, 2010 in related co-pending U.S. Appl. No. 10/628,178.
Second Notification of Office action issued by the State Intellectual Property Office of Chine on Jun. 10, 2010 in related Chinese Patent Application No. 200610109167.7, (4 pages); English Translation (8 pages).
First Chinese Office Action mailed Jun. 21, 2010 in related Chinese Application No. 20050005149.8. (4 pages); English Translation (6 pages).

* cited by examiner

120
CONSUMER AND MERCHANT MESSAGE ENCRYPTION
AND SECURE TRANSACTION SERVER PROCESSING

408

| | UNENCRYPTED | | | | | | | | | | |
|---|---|---|---|---|---|---|---|---|---|---|---|
| MESSAGE | UDID | TIMESTAMP | | | | | | | | | |
| A | X | X | | | | | | | | | |
| B | X | X | | | | | | | | | |
| C | X | X | | | | | | | | | |
| D | X | X | | | | | | | | | |
| E | X | X | | | | | | | | | |
| F | X | X | | | | | | | | | |

406

| | ENCRYPTED | | | | | | | | | | | | | |
|---|---|---|---|---|---|---|---|---|---|---|---|---|---|---|
| MESSAGE | MESSAGE TYPE | TIMESTAMP | PENDING REQUEST LIST | ACCOUNT LIST | ID (PHONE #/EMAIL) | FULL NAME | PEER UDID | SUCCESS/FAIL CODE | PAYER UDID | PAYEE UDID | AMOUNT | ACCOUNT | RECEIPT | TRANSACTION ID |
| A | X | X | | | | | | X | | | | | | |
| B | X | X | X | X | | | | X | | | | | | X |
| C | X | X | | | X | | | X | | | | | | |
| D | X | X | | X | X | X | X | X | | | | | | |
| E/F | X | X | | | | | | X | X | X | X | X | | X |
| G | X | X | | | | | | X | | | | | X | X |

MESSAGE A: PENDING REQUEST LIST REQUEST
MESSAGE B: PENDING REQUEST LIST REPLY
MESSAGE C: PEER IDENTIFICATION REQUEST
MESSAGE D: PEER IDENTIFICATION REPLY
MESSAGE E/F: MAKE PAYMENT REQUEST / REQUEST PAYMENT REQUEST
MESSAGE G: TRANSACTION RESULT

FIG. 11

WIRELESS WALLET

CROSS-REFERENCE TO RELATED APPLICATION(S)

This application is related to and is a continuation-in-part of U.S. application Ser. No. 10/458,205, filed Jun. 11, 2003, now U.S. Pat. No. 7,353,382 which claims the benefit of U.S. provisional application No. 60/401,807, filed Aug. 8, 2002; and also a continuation-in-part of U.S. application Ser. No. 10/628,584 filed Jul. 29, 2003, which claims the benefit of U.S. provisional application No. 60/401,807 filed Aug. 8, 2002; and also a continuation-in-part of U.S. application Ser. No. 10/628,569 filed Jul. 29, 2003, which claims the benefit of U.S. provisional application Ser. No. 60/401,807 filed Aug. 8, 2002; and also a continuation-in-part of U.S. application Ser. No. 10/628,583 filed Jul. 29, 2003, which claims the benefit of U.S. provisional application No. 60/401,807 filed Aug. 8, 2002.

This application is also related to and also claims the benefit of priority to, Provisional Application U.S. Ser. No. 60/544,300, entitled A UNIVERSAL PERVASIVE TRANSACTION FRAMEWORK APPLICATION: WIRELESS WALLET ON A MOBILE PHONE, by Yannis Labrou, Jonathan Agre, Lusheng Ji, Jesus Molina Terriza, Wei-lun Chen, and, filed Feb. 17, 2004 in the U.S. Patent and Trademark Office, the contents of which are incorporated herein by reference.

This application is also related to, and also claims the benefit of priority to, Provisional Application U.S. Ser. No. 60/549,148, entitled WIRELESS WALLET, by Yannis Labrou, Jonathan Agre, Lusheng Ji, Jesus Molina Terriza, Wei-lun Chen, and, filed Mar. 3, 2004 in the U.S. Patent and Trademark Office, the contents of which are incorporated herein by reference.

This application is also related to, and also claims the benefit of priority to, Provisional Application U.S. Ser. No. 60/575,835, entitled A WIRELESS WALLET FOR PERSON-TO-PERSON TRANSACTIONS, by Yannis Labrou, Jonathan Agre, Lusheng Ji, Jesus Molina Terriza, Wei-lun Chen, and, filed Jun. 2, 2004 in the U.S. Patent and Trademark Office, the contents of which are incorporated herein by reference.

This application is related to Provisional Application U.S. Ser. No. 60/401,807, filed Aug. 8, 2002 in the U.S. Patent and Trademark Office, the contents of which are incorporated herein by reference.

This application is related to U.S. Ser. No. 10/458,205, entitled SECURITY FRAMEWORK AND PROTOCOL FOR UNIVERSAL PERVASIVE TRANSACTIONS, by Yannis Labrou, Lusheng Ji, and Jonathan Agre, filed Jun. 11, 2003 in the U.S. Patent and Trademark Office, the contents of which are incorporated herein by reference.

This application is related to U.S. Ser. No. 10/628,584, entitled METHODS FOR PURCHASING OF GOODS AND SERVICES, by Yannis Labrou, Lusheng Ji, and Jonathan Agre, filed Jul. 29, 2003 in the U.S. Patent and Trademark Office, the contents of which are incorporated herein by reference.

This application is related to U.S. Ser. No. 10/628,569, entitled APPARATUSES FOR PURCHASING OF GOODS AND SERVICES, by Yannis Labrou, Lusheng Ji, and Jonathan Agre, filed Jul. 29, 2003 in the U.S. Patent and Trademark Office, the contents of which are incorporated herein by reference.

This application is related to U.S. Ser. No. 10/628,583, entitled FRAMEWORK AND SYSTEM FOR PURCHASING OF GOODS AND SERVICES, by Yannis Labrou, Lusheng Ji, and Jonathan Agre, filed Jul. 29, 2003 in the U.S. Patent and Trademark Office, the contents of which are incorporated herein by reference.

BACKGROUND OF THE INVENTION

1. Field of the Invention

The present invention is directed to wireless computing device authenticable transactions, for example, authenticable cashless monetary transactions. For example, a mobile phone wireless wallet.

2. Description of the Related Art

The future ubiquitous computing environment will consist of mobile users with information computing appliances (mobile devices), such as cellular phones or Personal Digital Assistants (PDA's), that will be wirelessly communicating and interacting with the varied services and devices encountered at any particular moment and place. Many applications that operate in such environments have been proposed from the research and business community, but there has not yet been a strong market pull for any particular one. It is apparent that a crucial enabler for ubiquitous computing to emerge into the marketplace is the ability to safely conduct financial transactions using mobile devices in this form of environment.

However, mobile devices, and, in particular, mobile phones, can present certain characteristics, such as limited capabilities (computation power, communication bandwidth, battery capacity, small display, limited keyboard, etc), a typical user who is not technically savvy and cannot be overly burdened with a complex application for executing transactions with other parties, and a wireless transport network that is deemed insecure at the network layer.

There have been many approaches and solutions proposed for the mobile commerce (m-commerce) problem. A few small manufacturers have offered Wireless Local-Area Network (WLAN)-enabled mobile phones and both MOTOROLA and NOKIA have made announcements of plans to offer such phones in 2004.

The current m-commerce practice involves Web Store-Front Payment, in which a consumer pays for goods or services offered by a retailer that has Internet presence. For web pages that are specially prepared for mobile devices, such as those that are WAP-enabled, one could use the mobile device to make a purchase as it is normally done in e-commerce transactions using a web browser on a personal computer. But, since payment typically requires logging in and typing a username and password, this approach is impractical and inefficient on a mobile device, even if the transaction uses Wireless Application Protocol (WAP) and has occurred through a secured network link such as through https or Secure Socket Layer (SSL). In many current web browsing applications, the consumer can pre-register one or more financial accounts with a merchant to save time and avoid repeatedly entering ones financial information, but this approach requires a consumer to register multiple user account information with multiple merchants. Further, in case of a physical point-of-sale (POS) case it is too complex to deploy from a business point of view because it frequently involves integration with the back-end store systems and some form of binding between the payer and the physical goods purchased.

From a data security perspective, existing m-commerce data security solutions rely on Public Key Infrastructure (PKI) technologies. However, PKI solutions suffer from poor computational performance in mobile device environments and complexity of the user experience. There are many different ways PKI can be used for mobile payments. One proposed PKI-based solution for mobile payments is by MET LIMITED, which is discussed at [www.mobiletransaction-.org, retrieved on Jan. 5, 2005]. Under existing m-commerce security solutions, a user signs a transaction (a purchase order) with a certificate that authenticates the identity of the user (it is unclear whether each user has a single such certificate or a variety of them, each for every eligible account). For example, handling of multiple security certificates from many vendors is confusing, at best, and can be dangerous if left up to the user. Since these certificates are stored on the mobile device, the certificate store needs to be protected and "unlocked" on a per use basis. If the certificate storage is implemented in software the key used to unlock the storage should be of sufficient length to protect this storage, or it can be instead implemented in hardware, which in case of a mobile phone would require the phone to be designed for this purpose. Such an approach requires an infrastructure for dissemination of certificates (including revocation), possibly specialized mobile phones and possibly some basic understanding by the user of certificates and their usage.

SUMMARY OF THE INVENTION

The embodiments described herein relate to wireless mobile computing device user electronically authenticable transactions, for example, mobile phone user authenticable cashless monetary transactions. For example, a user mobile phone wireless wallet.

A mobile phone system and method of initializing, at a secure transaction server (STS), a mobile payment software with a software authentication parameter, as an authentic mobile payment software; providing an STS correlation between a personal identification entry (PIE) and the authentic mobile payment software; installing, in a mobile phone, the authentic mobile payment software; and inputting, by a user, the PIE to the installed authentic mobile payment software to generate according to the PIE and the software authentication parameter a transformed, secure authenticable mobile phone cashless monetary transaction over a mobile phone network, as a mobile phone wireless wallet of the user of the mobile phone. The mobile phone authenticable cashless monetary transaction is performed according to an agreement view(s) protocol.

The above as well as additional aspects and advantages will be set forth in part in the description which follows and, in part, will be obvious from the description, or may be learned by practice of the described embodiments.

BRIEF DESCRIPTION OF THE DRAWINGS

These together with other aspects and advantages which will be subsequently apparent, reside in the details of construction and operation as more fully hereinafter described and claimed, reference being had to the accompanying drawings forming a part hereof, wherein like numerals refer to like parts throughout.

FIGS. 11-12 are diagrams of mobile phone cashless monetary transaction message formats to execute various mobile phone person-to-person cashless monetary transactions, according to an embodiment of the present invention.

DETAILED DESCRIPTION OF THE PREFERRED EMBODIMENTS

Reference will now be made in detail to the present embodiments of the present invention, examples of which are illustrated in the accompanying drawings. The embodiments are described below to explain the present invention by referring to the figures.

Generally, there can be three classes of mobile commerce transactions, as follows:

1. Person-to-person payments: A consumer can directly make an agreed upon payment to another consumer using their mobile devices.

2. Web Store-Front Payment: A consumer pays for goods or services offered by a retailer that has an Internet presence. A user browses the retailer's web pages using a mobile device to identify the good or service to be purchased and then conducts payment. Examples of this case would be paying for a book or purchasing movie tickets through a web service.

3. Physical Point-of-Sale (POS) purchase: A consumer pays a retailer at a check-out station using the mobile device, such as when making a payment at a "brick and mortar" store or restaurant.

The boundaries between these categories are malleable and their common properties can be exploited using the transaction agreement point of view. The embodiment(s) described herein accommodates these and/or other mobile commerce transactions.

In the described embodiments herein, a mobile device is any wireless handheld, or hand size, electronic computing device, including, without limitation, a mobile phone. The embodiment(s) described herein relate to wireless mobile computing device user electronically authenticable transactions based upon Universal Pervasive Transaction Framework Secure Agreement Submission (UPTF SAS) protocol, such as (without limitation) mobile phone user authenticable transactions that may or may not result in a financial settlement, and/or mobile phone user authenticable cashless financial/monetary transactions. For example, a user authenticable mobile phone wireless wallet. More particularly, according to an aspect of the embodiment(s) described herein, a wireless mobile computing device provides user electronically authenticable transactions according to time and software dependent secured (e.g., encrypted), matched (verified against each other), and transaction party anonymous, transaction view(s) of one or more parties (i.e., in a typical embodiment paired and/or more than two transaction views).

Figure 1A:
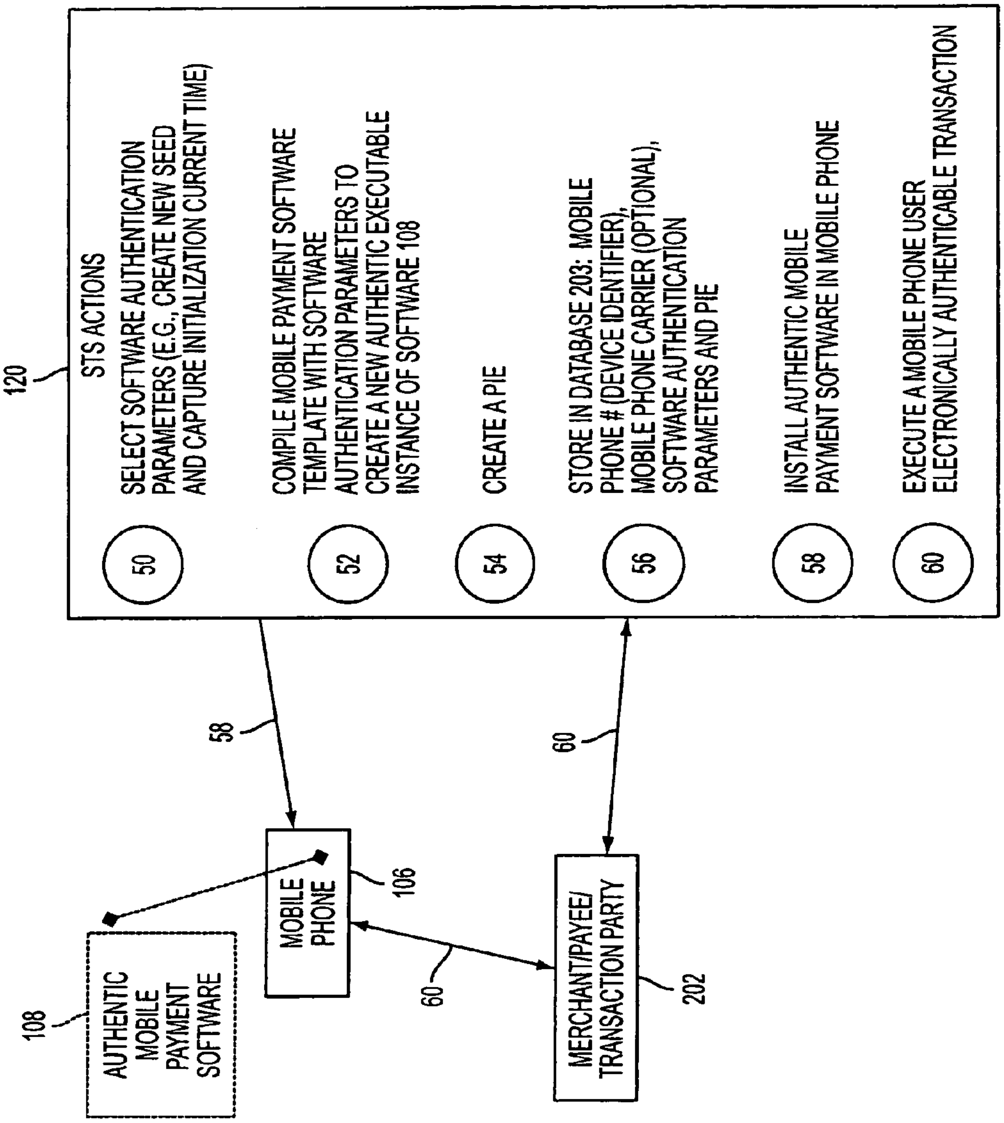
FIG. 1A is a flow chart of activating a mobile phone cashless monetary transaction capability, according to an embodiment of the present invention.

FIG. 1A is a flow chart of activating a mobile phone cashless monetary transaction capability, according to an embodiment of the present invention. A computer system and method for a wireless mobile computing device user electronically authenticable transactions (i.e., electronic authentication of a user and/or the user's transaction) comprises, at operations 50 and 52, initializing, at a secure transaction server (STS) 120, a mobile payment software template with software authentication parameter(s), as an authentic mobile payment software 108. At operations 54 and 56, correlating, at the STS 120, a personal identification entry (PIE) and an identifier of a mobile phone 106 with the authentic mobile payment software 108. At operation 58, installing, in the mobile phone 106, the authentic mobile payment software 108. At operation 60, executing, at the mobile phone 106, the installed authentic mobile payment software 108 using the PIE to execute a mobile phone authenticable cashless monetary transaction as a mobile phone wireless wallet of a user of the mobile phone 106. More particularly, at operation 60, inputting by a user the PIE to the installed authentic mobile payment software to generate according to the PIE and the software authentication parameter, a transformed secure authenticable mobile phone cashless monetary transaction. According to an aspect of the embodiment described herein, at operation 50, one or more software authentication parameters are selected, which can be (without limitation) creation of a new seed, such as a new random seed number, and an initialization time. At operation 56, the STS 120 stores in a database 203, a unique identifier (referred to as Device ID, or DID) for the mobile phone 106, which can, for example, be a mobile phone number of the mobile phone 106 or some randomly generated globally unique identifier (GUID), a mobile phone carrier (as the case may be), the software authentication parameter(s) selected at operation 50, and the generated PIE. According to an aspect of the described embodiment, a mobile phone number can also be used as a device identifier for the mobile phone 106. The unique identifier (device ID (DID)) of the mobile phone 106 is used by the STS 120 to correlate a transaction message with authentic mobile phone payment software 108; to correlate the DID with the software authentication parameter(s) and the PIE stored at the STS 120 so that the STS 120 can generate a key that corresponds to a device 106 having the DID. The mobile phone number can be used to communicate (e.g., notifications, etc.) with the mobile phone 106 (e.g., Short Message Service (SMS) and/or Multimedia Message Service (MMS)). The mobile phone 106 can be an Internet enabled, according to known techniques, mobile phone. The PIE is described in more detail further below. The mobile phone authenticable cashless monetary transaction is performed according to an agreement view(s) protocol known as Universal Pervasive Transaction Framework (UPTF) (described in more detail below) and secured (e.g., encrypted) according to a protocol known as Secure Agreement Submission (SAS) (described in more detail below). According to an aspect of the embodiment(s) described herein, a transaction message is bound to a unique combination of a user and a device (e.g., mobile phone wireless wallet 106), the binding to the user is via the PIE and the binding to the device 106 is via the software authentication parameter(s) of the authentic mobile payment software 108. In particular, a transaction is an SAS based encrypted message and the encrypted message can be traced back to a combination of the user and the device 106 through the PIE and the software authentication parameter(s) of the authentic mobile payment software 108.

Figure 1B:
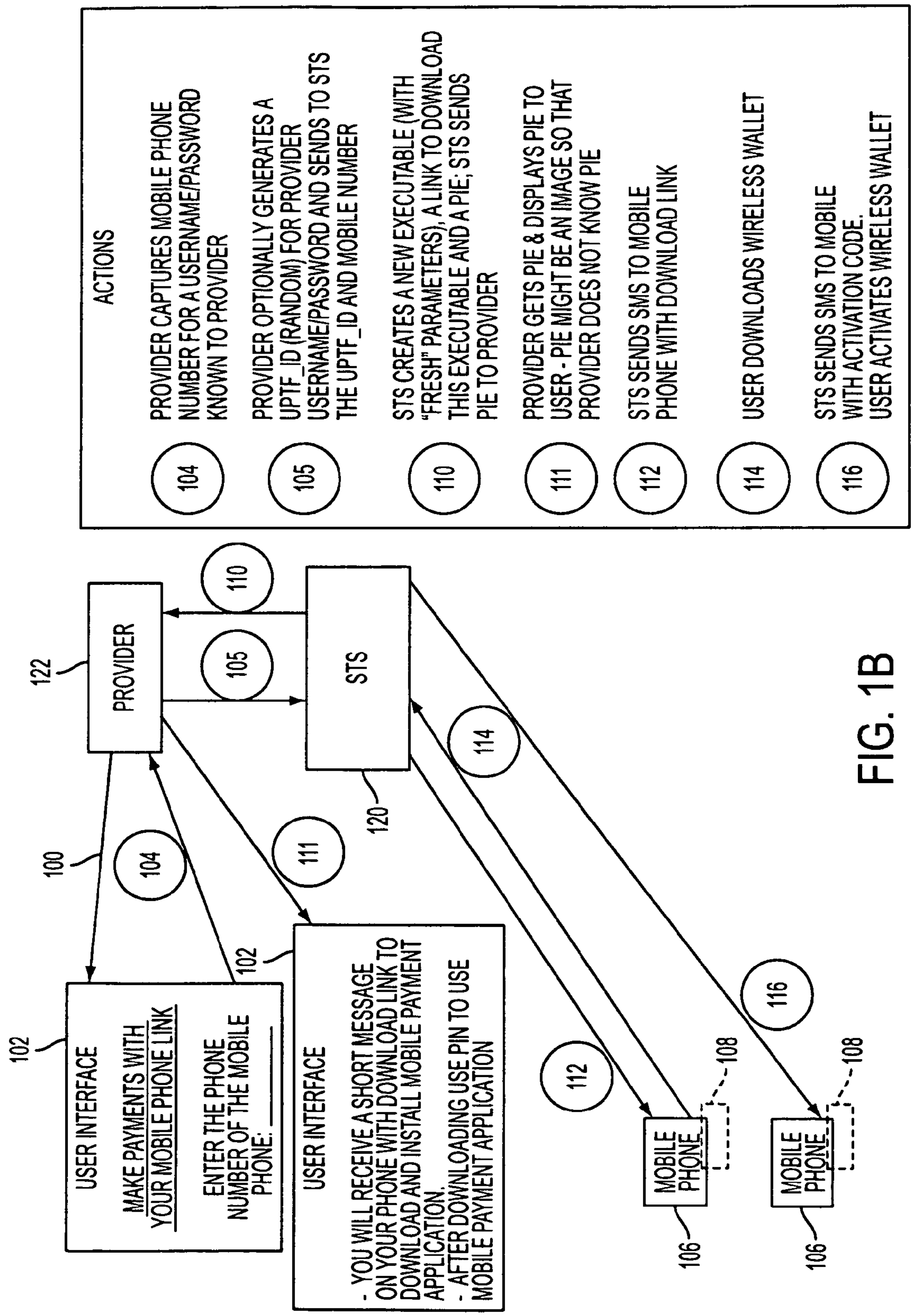
FIG. 1B is a flow chart of activating a mobile phone cashless monetary transaction capability, according to another embodiment of the present invention.

FIG. 1B is a flow chart of activating a mobile phone cashless monetary transaction capability, according to another embodiment of the present invention. In FIG. 1B, a computer system and method comprises, at operation 100, providing to a user a mobile phone cashless monetary transaction activation link at a computing device 102 (sign-up application 102), at operation 104, registering a phone number of a mobile phone 106 of the user via the activation link, at operation 105, associating a mobile payment software 108 with software authentication parameters, as an authentic mobile payment software 108, and, at operation 110, providing a correlation between a personal identification entry (PIE) and the authentic mobile payment software 108, at the STS 120. At operation 112, a mobile phone download link to the mobile payment software 108 is transmitted to the mobile phone 106, using the registered phone number of the mobile phone 106. At operation 114, the mobile payment software 108 is downloaded to the mobile phone 106 via the download link. At operation 116, the user can activate the downloaded mobile payment software 108 using an optional activation code. After installation of the authentic mobile payment software 108, as a user mobile phone wireless wallet 106 of the mobile phone user (i.e., a mobile phone wireless wallet application 108), the user can execute a mobile phone user electronically authenticable cashless monetary transaction using the user mobile phone wireless wallet 106.

The mobile payment software 108 is implemented according to an application platform of the mobile phone 106. For example, the mobile payment software 108 can be implemented according to Java 2 Platform Micro Edition (J2ME). According to an aspect of the embodiment described herein, at operation 112, the mobile payment software downloaded link is transmitted to the mobile phone 106 using short message service (SMS) and/or multimedia message service (MMS).

In FIG. 1B, after operation 116, a mobile phone cashless monetary transaction may be performed according to Universal Pervasive Transaction Framework Secure Agreement Submission (UPTF SAS) protocol. The UPTF SAS protocol is discussed in related commonly assigned pending U.S. patent application Ser. No. 10/458,205, filed Jun. 11, 2003; Ser. No. 10/628,584, filed Jul. 29, 2003; Ser. No. 10/628,569, filed Jul. 29, 2003; and Ser. No. 10/628,583, filed Jul. 29, 2003, owned by FUJITSU LIMITED assignee of the present Application, the entire disclosures of all of which are hereby incorporated herein by reference.

In FIG. 1B, at operation 105, the associating of the mobile payment software 108 with the software authentication parameters comprises generating a UPTF random number identifier by a provider 122 of the mobile phone cashless monetary transaction activation, so that the UPTF random number can be associated with the user and transmitting the UPTF random number identifier and the registered phone number of the mobile phone 106 to a secure transaction server (STS) 120. For example, at operation 105, in case the provider 122 is a payment service 122 at which a transaction party (a user) registers financial account information, the payment service 122 can assign a UPTF random number identifier (abstracted identifier) 123 to identify the user when communicating with the STS 120. Accordingly, the STS 120 can communicate with the provider 122 to execute a UPTF based transaction based upon the provider 122 UPTF random number and without knowledge of actual transaction party account information. Further, operation 110, comprises generating, by the STS 120, an executable mobile payment software including the initialization parameters, as the authentic mobile payment software, and generating the PIE that is correlated in the STS with the authentic mobile payment software 108. At operation 112, the transmitting of the mobile payment software download link comprises transmitting, by the STS 120, via short message service (SMS) the mobile payment software 108 download link to the mobile phone 106 of the user; and providing, by the STS 120, the PIE to the user. The described embodiment is not limited to the above-described authentic mobile payment software 108 generation, activation, and installation, and, at operation 58, an authentic mobile payment software 108 can be installed or provided for a mobile phone 106 via mobile phone removable/installable (e.g., smart card) and/or embedded computer readable media, embedded in a mobile phone computing processor, via an emailed download link, emailed attachment, etc.

Figure 1C:
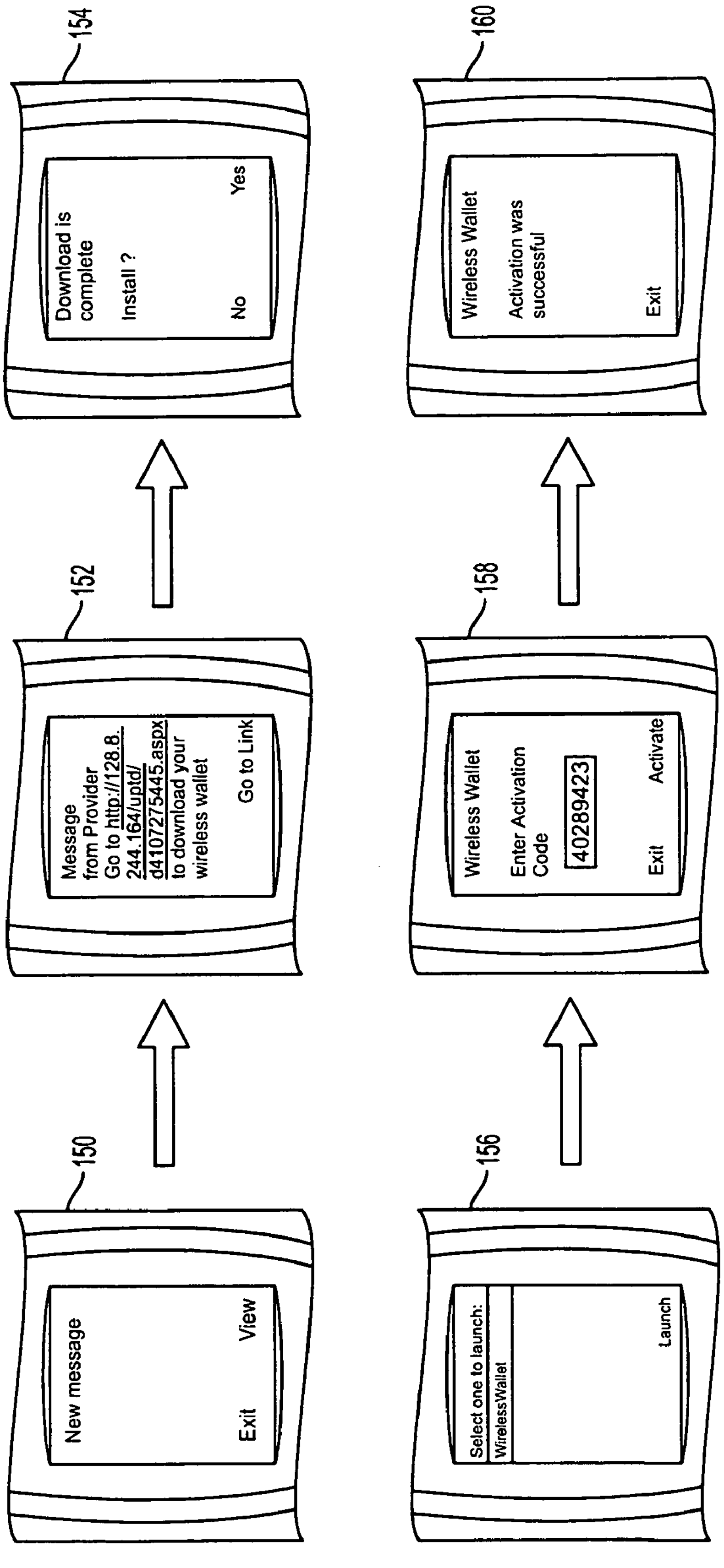
FIG. 1C is a diagram of mobile phone display screen user interface images to activate a mobile phone cashless monetary transaction, according to an embodiment of the present invention.

FIG. 1C is a diagram of mobile phone display screen user interface images to activate a mobile phone cashless monetary transaction, according to an embodiment of the present invention. User interface screen image 150 is displayed at operation 112, when the mobile phone 106 receives an SMS message from the STS 120 on behalf of the provider 122. User interface screen image 152 displays the received SMS message directing the mobile phone user to go to an Internet address to download the authentic wireless wallet software 108. The user interface screen image 154 is displayed after operation 114, when downloading of the authentic wireless wallet software 108 to the mobile phone 106 is completed. The user interface screen image 156 is displayed when installing the authentic wireless wallet software 108. The user interface screen image 158 is displayed at operation 116, when an optional activation code for the authentic wireless wallet software 108 has been provided to be input at the mobile phone 106. After input of the activation code via the user interface screen image 158, the user interface screen image 160 is displayed, confirming to the user that the authentic wireless wallet software 108 has been activated and ready for executing mobile phone user electronically authenticable cashless monetary transactions.

According to an aspect of the described embodiment herein, at operation 100, a provider 122, such as an online payment system/service, a merchant/service provider, a financial institution, etc., provides the mobile phone cashless monetary transaction activation link to a member of the provider 122 as the user. In case of an online payment system 122, the described embodiment provides member-to-member mobile phone cashless monetary transactions using the user mobile phone wireless wallet 108.

According to an aspect of the described embodiment herein, at operation 110, the STS 120 sends the PIE to the provider 122, and, at operation 111, the provider 122 receives the PIE and displays the PIE to the user at the computer 102. At operation 111, for additional security, the PIE might only be an image so that the provider 122 does not know the PIE, thereby allowing for anonymity of the transaction parties. The PIE can be delivered according to other secured ways, such as mail, email, a customer service representative, etc.

Therefore, with reference to FIGS. 1A and 1B, in an unlimiting example, the wireless wallet application 108 is implemented as a J2ME application than can be downloaded and executed on the mobile phone 106 and enables users to make purchases and payments leveraging Universal Pervasive Transaction Framework (UPTF). Currently, many mobile phones offered by carriers in the US are J2ME enabled and web-enabled, such that the wide-spread availability of J2ME on mobile phones enables new business models with respect to the delivery of content and services to mobile users. With J2ME, anyone can develop downloadable J2ME applications for custom content or service delivery to the mobile. This is the case of the wireless wallet application 108, which allows offering the service of secure payments using mobile phones 106.

The J2ME wireless wallet application is a relatively small application (typically according to the present invention less than 90 Kbytes) which combines the functionality of a web browser (for example, a cHTML web browser) and that of the purchasing application that implements the UPTF SAS framework and security protocol. It allows mobile users to enable or disable the payment functionality and to store receipts of purchase. The wireless wallet method can be offered by any retailer or payment service in order for consumers to make payments with their mobile phone. It is a completely software solution to the problem of secure payments using a mobile device. If the provider of the wireless wallet is a web store-front retailer, such as a movie ticket provider, the wireless wallet application 108 can be used to make payments with any of the accounts registered with the retailer. If the provider is an Online Payment Service, the wireless wallet software 108 can be used to make payments to other online payment service users (person-to-person) or to "brick and mortar" retailers that accept payment with this payment service or a central service/system that can interface a plurality of payment services. In the latter case, the merchant can use a merchant's version of the wireless wallet client 108 to specify transaction information, such as the payment amount. The issue of identifying what is being paid for by the consumer via a mobile phone 106 is addressed by having the consumer enter a receipt number (e.g., as printed in the receipt of the restaurant where the meal is paid for) and/or a merchant identifier (e.g., a phone number of the merchant, including merchant POS identifier, etc.) on their wireless wallet application 108 to interface with the merchant retail application software; the goal being to bind a virtual shopping cart to a specific consumer.

A more detailed mobile payment software 108 download and activation is described as follows:

1. After a user logs into a Provider's 122 web site using a computer device, such as personal computer 102, the option of using one's mobile phone for payments is presented and the user is re-directed to a page where one is asked for a phone number of the mobile phone to be used for mobile phone cashless money payments.

2. The Provider 122 generates a UPTF_ID (random number) for the already captured username and password (operation 105) and sends to the STS 120 the UPTF_ID and mobile number. Therefore, in this example, the Provider 122 does not have to share with the operator of the STS 120 real account information of the user, but the provider 122 and the STS 120 relate transactions to a user based upon a random identifier generated by the provider 122.

3. The STS 120 then creates a new wireless wallet executable 108 (with "fresh" initialization parameters per the UPTF requirements), a link to download this executable, an optional activation code, and a personal identification entry (PIE), all of which are correlated at and maintained by the STS 120 (operations 50-56 and 110). The STS 120 can send the PIE to the Provider 122.

4. If the STS 120 sends the PIE to the Provider 122, the PIE is received by the provider 122 and displayed to the user (operation 111). Optionally, the STS 120 can provide an activation code to the user via SMS (e.g., at operation 116) or via the provider 122 (e.g., at operation 111). Alternatively, the PIE and the activation code (as the case may be) can be communicated to the user through channels other than the provider 122 or SMS, for example, via mail, email, etc. Typically in the present invention, the activation code is a number (for easier user entry) and used as a one time password that encrypts the UPTF-related initialization parameters of the downloaded software 108, so that if a third party attacker intercepts the software while in transit, the attacker cannot have access to the device-specific initialization parameters.

5. The STS sends a Short Message Service (SMS) message to the previously entered mobile's phone number with the download link (operation 112).

6. The mobile user downloads the wireless wallet software 108 (e.g., at operation 114, the link can be easily followed directly from the SMS text itself and subsequently uses the wireless wallet software 108 (operation 116). An initial activation can involve using the activation code. Otherwise, at operation 116, the user can subsequently use the wireless wallet software 108 to execute a mobile phone cashless monetary transaction by using only the PIE.

After operation 114 (after downloading wireless wallet application 108 into the mobile phone 106), the wireless wallet 108 is ready for use; purchases and/or financial transactions can be paid for with any of the accounts registered with the wireless wallet provider 122. This scheme for distributing the software ensures a secure distribution of the software, on request, and a safe dissemination of the PIE. A mobile phone wireless wallet software 108 distribution model has been implemented for downloading and installing a J2ME executable on the mobile phone 106. Operation of the software 108 is very easy and transaction time largely depends on the speed of the mobile phone carrier's network. Based on tests, a mobile phone cashless monetary transaction time can vary between 30 and 45 seconds, the differences due to a mobile carrier's network-related delays. The traffic generated by the mobile payment software application 108 (following the determination of what is purchased) is less than 1 KByte (send/receive) for each transaction, as each mobile phone cashless monetary transaction message can be smaller than 256 bytes. In an unlimiting example, communication between the mobile phone 106 and the STS 120 during payment was routed either through a provider 122 or directly to the STS 120 (depending on the type of financial transaction and as will be described in more detail below) and was carried over Internet Hypertext Transfer Protocol (HTTP) on a mobile phone communication network. More particularly, because the UPTF SAS security is session-less based upon message view (as described in more detail below) encryption (i.e., not based upon communication session security), such as secure socket layer (SSL), secured transaction processing efficiency by the mobile phone 106 is substantially improved.

Figure 2:
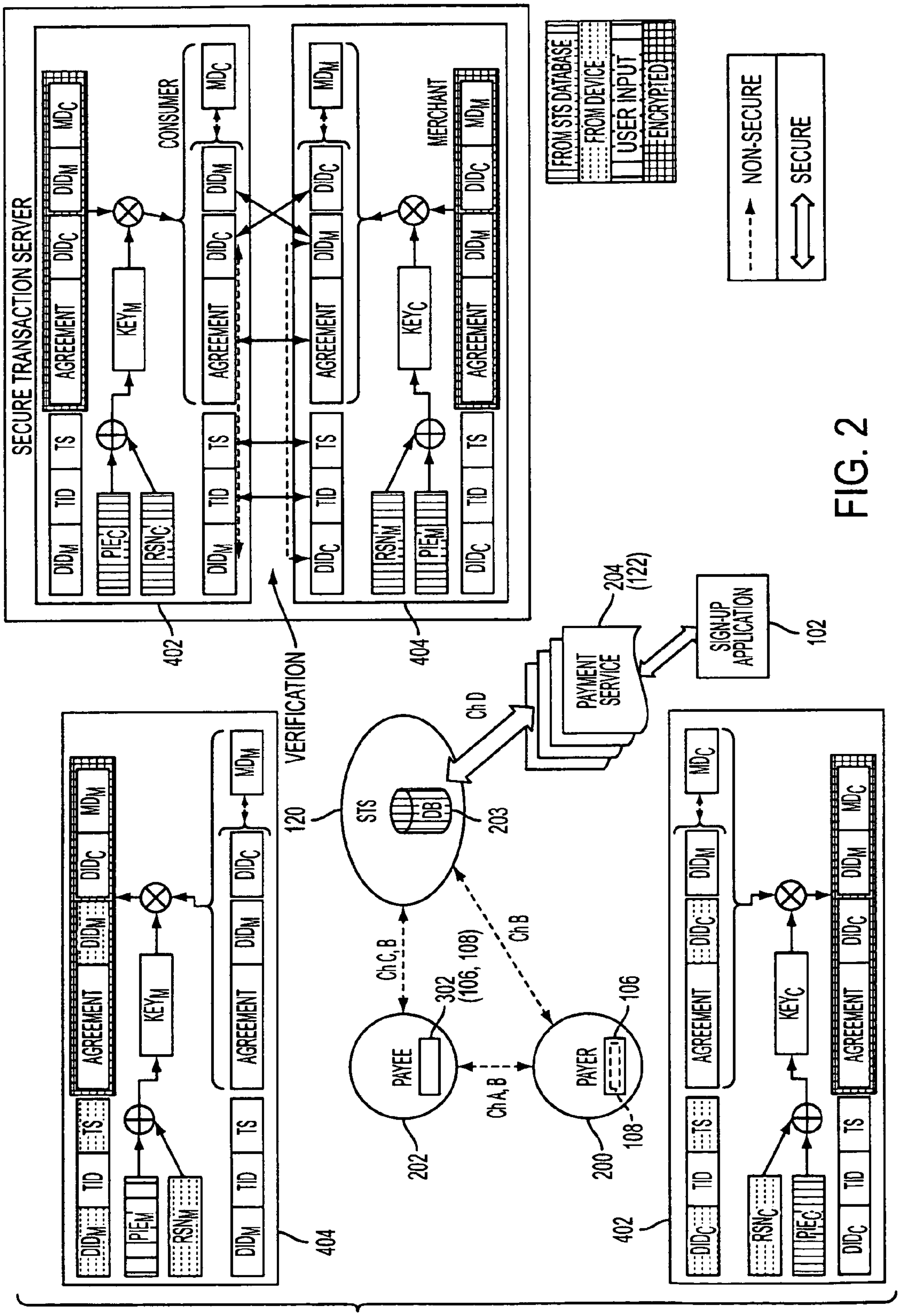
FIG. 2 is a functional block diagram of Universal Pervasive Transaction Framework Secure Agreement Submission (UPTF SAS) system architecture to execute a mobile device cashless monetary transaction, according to an embodiment of the present invention.

FIG. 2 is a functional block diagram of Universal Pervasive Transaction Framework Secure Agreement Submission (UPTF SAS) system architecture to execute a mobile device cashless monetary transaction, according to an embodiment of the present invention. In FIG. 2, colors are used to highlight features/concepts described herein. The Universal Pervasive Transaction Framework (UPTF) defines a system architecture based upon independent and anonymous transaction agreement views and a communication security protocol called the Secure Agreement Submission (SAS) protocol to transmit the views. Essentially the UPTF offers a vessel, which is able to securely carry the individual views of a transaction agreement from each party involved in the transaction to a trusted third party for verification, using a communication network which may consist of insecure segments such as wireless LANs or cellular links. When used for financial applications, such as the electronic wireless wallet, the transaction parties are payer 200 and a payee 202, for example, a customer payer 200 and a merchant payee 202, and a typical example of an "agreement" may read: "Party A will pay Party B $X for item Y."

The UPTF SAS protocol encrypts/decrypts a transaction message using a symmetric, secret-key approach where the secret key is producible only by an individual party's device 106 and a trusted third party (e.g., implemented as STS 120) and without transmission of the secret key among the parties. In other words, the UPTF SAS provides an implicit user authentication, because decryption by a trusted third party, such as STS 120, of a sending party's encrypted message, authenticates the sending party. The SAS insures that the authenticity of the parties is verified and during delivery, the privacy of the information is preserved (transaction party anonymity), even when the parties distrust each other and the messages from one party may be forwarded by the other to the third party verification. The UPTF also provides the mechanism for the trusted third party to verify that the independent views of the agreement are consistent with each other.

After the agreement data is extracted from the transaction views received from the parties and the data is verified by the trusted third party, further actions may need to be taken to actually execute the agreement. This is realized by the trusted third party interacting with the financial institutions associated with the payer 200 and the payee 202 to cause the transfer of the specified funds between the customer payer 200 and the merchant payee 202.

The wireless wallet UPTF system architecture is shown in FIG. 2 and comprises: a Payer 200 operating a UPTF device (called a UPTD), such as a mobile phone 106 loaded with a mobile phone wireless wallet 108, a Payee 202 operating another UPTF device, a Secure Transaction Server (STS) 120, a number of financial institutions 204, and several communication channels among them. For example, the payer 200 operates the mobile phone wireless wallet 106 to interact with the Payee 202 to determine the details of a purchase transaction and executes the UPTF protocol and its corresponding security operations SAS. The mobile phone wireless wallet 106 can support wireless communication capability necessary for discovering/interfacing with the payees 202 via service spots of the payees 202 (a place where a signal can exist to connect to the mobile phone wireless wallet 106). The wireless communication capability of the mobile phone wireless wallet 106 to communicate with a service spot payee 202 and/or an STS 120 can be wireless local area network (WLAN) and/or mobile phone communication (cellular) network. The mobile phone wireless wallet 106 can also have a user interface for interacting with the payee 202 through some common application and to the STS 120 as needed. The Payee 202 can also operate a UPTD, such as a merchant transaction server (MTS) 302 that implements a retail application, and is responsible for interacting with the payer 200, executing the UPTF protocol and its corresponding security operations and interacting with the STS 120. In FIG. 1B, in case the provider 122 is an online payment system, the provider 122 would correspond to the financial institutions 204 of FIG. 2, which allows any type of UPTD person-to-person cashless monetary transactions via Channels A, B, and C as logical communication channels. Of course, the STS 120 and the financial institutions 204 might be implemented by a single entity or separate entities, as the case may be.

According to an aspect of the embodiment described herein, the STS 120 is a backend verification server on which both the payer 200 and the payee 202 have registered and provided identifying account information that is maintained in a secure STS database 203. The secret information used for encrypting the messages to/from each payer 200 and payee 202 are also stored in this DB 203. The STS 120 receives independently generated UPTF SAS transaction views (described in more detail further below) from both the payer 200 and the payee 202 regarding a financial transaction conducted between them. The STS 120 is able to decode both of the views using information from UPTF SAS cashless monetary transaction messages and the information stored in the STS 120 database 203. Following successful decoding, the STS 120 verifies that the view messages are original, authentic, involve the intended payer 200 and payee 202 and that the information fields in the agreement views are consistent with each other. The STS 120 will maintain a log of messaging activity for non-repudiation purposes.

In FIG. 2, a generic set of communication channels are explicitly indicated. The indicated communication channels reflect anonymity of the transaction party communications (anonymous transaction party communication channels) according to the UPTF. Channel A (Ch A) logically represents the link between the payer 200 and the payee 202. This link is used to negotiate the details of a cashless payment transaction. This aspect is application dependent and is not considered to be part of the UPTF framework. Ch A may or may not exist, and if it exists it can be a wireless channel, for example, in case of a WLAN enabled mobile phone 106, and/or channel A can be oral communication between the payer 200 and payee 202 in case of a non-WLAN mobile phone 106 used in a point of sale financial transaction. Channels B and C, are example logical links among the Payer 200, the Payee 202, and the STS 120. In case of a mobile phone wireless wallet 106, Channels B and C are mobile phone communication networks that can carry Internet traffic. In most situations these are not direct links, but involve communicating through the mobile communications network and/or the Internet. In general, these are insecure channels. Channel D, from the STS 120 to the Financial Institutions 204 is a different type of channel and is assumed to be a highly secure communication path. In addition, STS 120 itself is assumed to be housed in a protected facility so that its database 203 is physically secure and inaccessible from the network.

The mobile phone wireless wallet 106 operations involved in an example transaction with reference to FIG. 2 is described. The payer (operator) 200 initiates the SAS protocol through an explicit action, enters the PIE generated in operation 110 by the STS 120. This allows the payer 200 to generate a view of the transaction and to encrypt this with its private key based upon the PIE and the software authentication parameter(s) and then to send the encrypted view as a message to the STS 120. Similarly, the payee (operator) 202 enters its PIE that is also generated in operation 110 by the STS 120 and generates it's own view of the transaction, encrypts the view with its private key based upon the PIE and the software authentication parameter(s) and then sends its view to the STS 120. The STS 120 receives both encrypted views and verifies the views, through a successful view decryption (i.e., a successful view decryption authenticates a user) and a successful comparison of two or more views (as the case may be) (i.e., a successful comparison of transaction party views authenticates a transaction). The STS 120 then uses the secure back channels D to interact with the financial institutions 204 of the payer 200 and the payee 202 for transferring the funds. The STS 120 sends receipts (or failure notices) back to the payer 200 and the payee 202 to complete the transaction. The response messages are also encrypted by the STS 120 for each intended destination.

Other examples described herein are particular instances of the FIG. 2 UPTF system architecture. In particular, the physical POS deployment represents a common variation of this scheme. For this situation, the Payer 200 is a customer device, such as the mobile phone 106 that executes the wireless wallet application 108, the Payee 202 is the merchant operated device. The merchant operated device is located at a fixed site and can be a more powerful computer and provide additional network services, such as an Internet connection. A direct payer 200 to STS 120 Ch B is not used, but rather the Payer 200 UPTF cashless monetary transaction messages are forwarded to the STS 120 through the merchant 202. In this case, channels A and B would be a mobile communication channel between the payer 200 and the merchant server 302 to bind the mobile phone user with transaction information of the merchant, such as the merchant products/services available for purchase and to forward, by the merchant server 302 to the STS 120, the payer 200 UPTF transaction messages (see FIGS. 3, 5 and 6). The properties of the protocol prevent the merchant from gathering personal information from the customer 200. Further details of the encryption procedures as part of the SAS are described further below.

Therefore, the mobile phone 106 wireless wallet application 108 is based on a general framework, called the Universal Pervasive Transaction Framework (UPTF), a generic architecture and a new security protocol for conducting secure multi-party agreements, using mobile devices over a wireless transport network. The framework is designed to address several key aspects specific to the envisioned pervasive environments.

Figure 3:
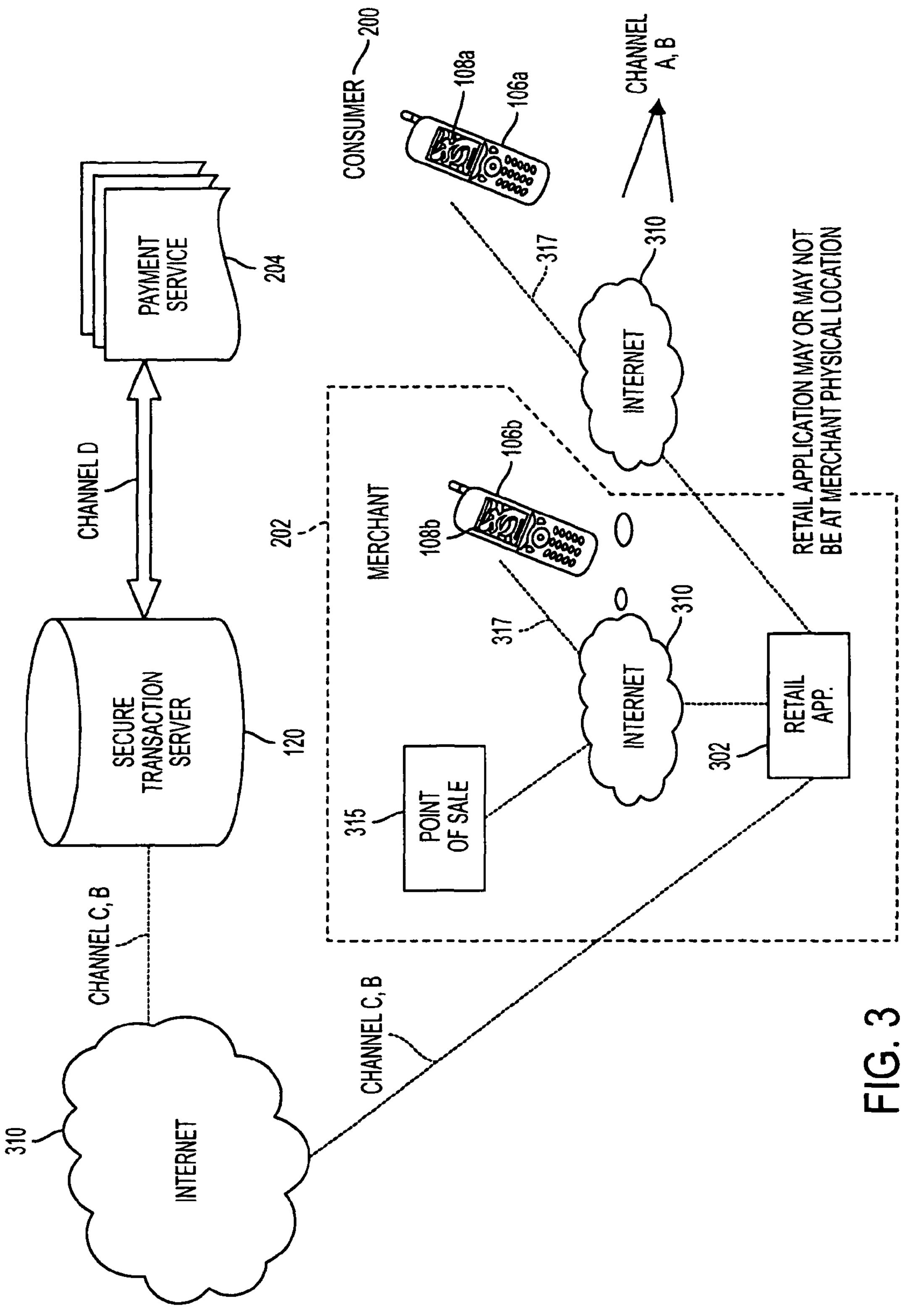
FIG. 3 is functional block diagram of a UPTF based system architecture to execute a mobile phone cashless monetary transaction with a physical point of sale (POS), according to an embodiment of the present invention.

FIG. 3 is functional block diagram of a UPTF based system architecture to execute a mobile phone cashless monetary transaction, according to an embodiment of the present invention. A universal pervasive transactions device (UPTD) is a wireless mobile computing device, such as mobile phones 106*a-n*, based upon the UPTF SAS to implement a wireless wallet by installing in the mobile phones 106*a-n* corresponding authentic mobile payment software 108*a-n*. A computer system and method of binding the mobile payment software 108*a* with transaction information of a transaction party (e.g., merchant online retail application 302); inputting the PIE by the user at the mobile phone 106*a* of the user; executing the authentic mobile payment software 108*a* and presenting, by the STS at the mobile phone 106*a*, a selectable list of abstracted relationship identifiers (identifiers that are a level removed from actual identifiers), corresponding to the registered financial entities of the user, that are correlated with the authentic mobile payment software 108*a*; and executing the mobile phone cashless monetary transaction with the transaction party 302 using the PIE and the software authentication parameter and according to UPTF transaction messages comprising an identifier of the mobile phone 106*a*, an identifier of the transaction party 302, and an identifier of the transaction, thereby providing the mobile phone wireless wallet based upon a combination of the authentic mobile payment software 108*a* at the mobile phone 106*a* and the STS 120 correlations of the authentic mobile payment software 108*a* with the PIE, the software authentication parameter, and the financial entities of the user, and independent, anonymous exchange of the UPTF transaction messages between the user, the transaction party and the STS. As described in more detail below, the authentic mobile payment software 108 and the STS 120 correlations result in generation of a security tool (e.g., an encryption key) to secure (e.g., encrypt) messages, and, thus, successfully decrypting each message authenticates a sender, and, in case of UPTF transaction messages, by decrypting and matching UPTF transaction views of one or more transacting parties authenticates the transaction.

A UPTD wireless wallet can be a WLAN enabled wallet-sized computing device, including a WLAN enabled mobile phone, able to detect UPTF-enabled physical points of sale (POS), to wirelessly connect to the POS using a wireless local area network/short range radio technology (e.g., 802.11, BLUETOOTH, Infrared, etc.), and to allow their owners to make purchases and or payments with the UPTD wireless wallet. A UPTD wireless wallet can also be a mobile phone without WLAN capability. UPTF authenticable transactions using a UPTD that is a WLAN enabled mobile phone is described in, and can also be understood, for example, by referring to, the pending U.S. patent application Ser. No. 10/628,583 filed Jul. 29, 2003 and owned by FUJITSU LIMITED assignee of the present patent application, which is incorporated herein by reference. In a typical embodiment described herein, the UPTD wireless wallet is an Internet and/or web capable/enabled mobile phone 106 (hereinafter referred to as a mobile phone 106 or as a mobile phone wireless wallet 106). For example, a mobile phone wireless wallet 106 could be used to place an order at a restaurant and subsequently make payment, as follows: (1) the user consumer 200, through activating a UPTD mobile phone wireless wallet software 108 function, according to the processes of FIG. 1A, interfaces over a mobile phone communication network 317 with a service spot merchant 202 (which, for example, could be a retail application server 302 on Internet 310 for a movie theater ticket, a gas station, etc., a point of sale 315 at a physical location of the merchant 202)—the retail application 302 implements a virtual store front (for ordering goods or retrieving the payment amount and is accessible through a web server) and implements the UPTF-related functions for effecting mobile phone cashless purchasing; (2) the mobile phone wireless wallet 106 displays a listing of the available merchant 202 offered services (via Channel A between the mobile phone wireless wallet 106 and the retail application 302 in FIGS. 2 and 3); (3) the consumer 200 selects the service (e.g., ordering a meal, or payment at checkout station) with a simple keypad input at the 106; (4) once a purchase amount is determined, the consumer 200 presses a designated payment button on the mobile phone wireless wallet 106, which begins the payment stage and results in retrieval of a purchase order (i.e., the agreement) from the merchant 202; following a visual inspection by the consumer 200, the consumer 200 is requested to input the consumer's security PIE (also optionally selecting which financial entity account to use for payment); (5) the consumer 200 receives on the mobile phone wireless wallet 106 a confirmation and a receipt, if the transaction was successful (the service spot merchant 202 also receives a notification of the successful transaction).

It is important that the payment stage (5) is explicitly initiated by the consumer 200, so that the consumer cannot be spoofed into typing a PIN into an attacker-served page. In a typical implementation of the embodiment described herein, pressing the payment button results in termination of a browsing application (e.g., an execution thread) executed at the mobile phone 106 and the launching of new application (e.g., another execution thread) for user entry (albeit transparent to the user). As long as the user never entered a PIE without first pressing a payment button, hijacking of the PIE can be prevented.

The retail application 302 implements a virtual store front (for ordering goods or retrieving the payment amount and is accessible through the web server) and the UPTF-related functions for effecting purchasing.

The mobile phone wireless wallet 106 can deliver a user experience to execute UPTF SAS based cashless monetary transactions in a fast and intuitive manner. The mobile phone wireless wallet software 108 delivers an implicit localization by allowing interfacing at any location (location independent) to merchants 202. The speed and its simple and unified interface are effective and with some practice, performing a transaction could be accomplished in seconds (e.g., 30 seconds, or less than 12 seconds in case of a WLAN mobile phone wireless wallet 106); which can be less than a typical cash or card transaction involving getting change or physical paper receipts. A consumer 200 could purchase (or be offered) a mobile phone wireless wallet 106, for example, on-line via the sign up application computer 102. In other words, the consumer 200 would obtain a PIE as well as obtain (download) a wireless wallet software 108 for a mobile phone to execute mobile phone UPTF SAS based transactions. Merchants 202 would provide UPTF SAS functions in retail and purchasing applications 302, 315.

Figure 4:
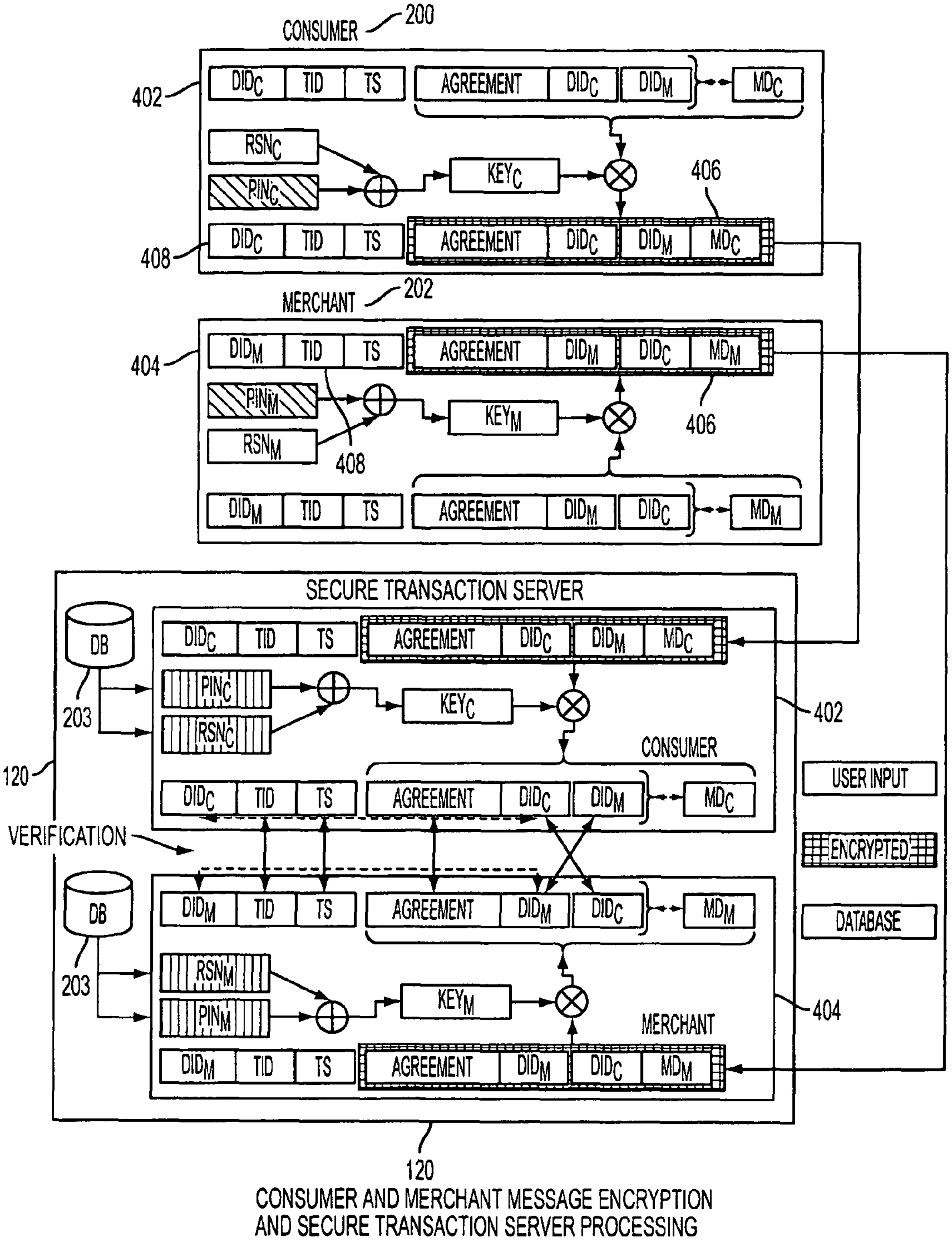
FIG. 4 is a diagram of UPTF cashless monetary transaction messages based upon Secure Agreement Submission (SAS) protocol to execute a mobile phone cashless monetary transaction, according to an embodiment of the present invention.

FIG. 4 is a diagram of UPTF cashless monetary transaction messages based upon Secure Agreement Submission (SAS) protocol to execute a mobile phone cashless monetary transaction, according to an embodiment of the present invention. In FIG. 4, colors are used to highlight features/concepts described herein. The SAS protocol is used for encrypting and submitting views of desired UPTF based cashless financial transactions. The message structure and encryption mechanism of SAS are designed to provide many of the desired security properties in an insecure pervasive communication environment envisioned for wireless purchasing, such as:

- Authentication: the agreement parties and the verification party are authenticated to each other, as is the integrity of the agreement group;
- Anonymity: agreement parties may remain anonymous to each other and personal and/or other account related information is not revealed to the other party;
- Protection of the agreement content: the agreement is kept private, it is tamper-resistant, non-replayable, and strong non-repudiation proper-ties are provided. In particular, a continuously changing, time dependent, device specific key is used to encrypt the views.

The underlying SAS algorithms are well-suited for a system using low-cost user devices, which have limited computing resources, while minimizing the complexity of use for the user. In addition, some of the information necessary to use the SAS, in particular the PIE, is not permanently stored on the UPTD 106 and not included in any data transmissions, so that if the UPTD 106 is lost or stolen, the UPTD 106 cannot be used. Additional details of the SAS and the encryption mechanism are provided with reference to FIG. 4, as follows.

The internal structure and the generation process of view messages 402, 404 (i.e., UPTF SAS cashless monetary transaction messages) are shown in FIG. 4. The UPTF SAS based views 402, 404 are implemented in software and/or computing hardware as the electronic wireless wallet software application 108 that is executed in the UPTD 106, such as the mobile phone 106. Since the views 402, 404 from the payer and the payee are symmetrical, the payer's 200 view 402 is only described. The symbols used in FIG. 4 are explained below:

DIDc: device ID, a unique identifier for the Payer's UPTD device 106 (the consumer (c) or source transaction party).

DIDm: device ID, a unique identifier for the Payee's device (the merchant (m) or destination transaction party).

RSN: random sequence number.

TS: local current timestamp.

TID: transaction ID, a unique identification number assigned to an agreement, which is maintained by the STS 120 to identify corresponding UPTF agreement views 402, 404.

MD: message digest

PIE: Personal identification entry, a user and STS 120 maintained input secret entry, such as an alphanumeric string. In a typical embodiment described herein, the PIE is only maintained by the user and the STS 120, is not known to and/or maintained by another party to a transaction and/or the financial institutions 122, 204, and is temporally known as an intermediate parameter to the mobile phone 106 of the payer 200 for encrypting the payer view 402. More particularly, the PIE is not included in transaction messages (e.g., UPTF SAS messages and/or SAS based informational messages) and, thus, the wireless wallet software 108 does not transmit the PIE. The PIE can be non-secure by being a substantially short alphanumeric string, such as a 4 digit number. The user enters the PIE whenever the user attempts a transaction. Preferably the PIE is issued to the user following the registration of the user for the application 108 that the client device 106 is used for. The user can also select the PIE at such time. The PIE is an alphanumeric string. In order to speed up the user entry to make it easier for the user to remember it, the PIE can be a number such as 4-digit or 5-digit PIN. The PIE is, however, a piece of highly secure information in the sense that it is never transmitted during the UPTF protocol execution, it is only known to the user and the STS 120, and its secrecy should be well protected. It is assumed that the PIE can be input by the user on a mobile phone 106 in a secure fashion or it may be deterministically generated using a biometric device such as a fingerprint sensor. For example, a computation applied on the fingerprint data received from a fingerprint sensor can be used to generate a PIE that is initially communicated by the user to the STS 120. Whenever the user attempts a transaction, the user applies her finger to the fingerprint sensor, thus generating the PIE. The PIE is not kept in permanent storage on the mobile phone 106, but is used as an intermediate parameter required for the generation of the encryption key for a transaction and it should not be retained by the device 106 for a period longer than the transaction execution time. If a particular implementation of the present invention uses a form of PIE that is not convenient for a user to input for each agreement transaction and the device needs to store its user's PIN, the storage must be secure and tamper-resistant.

As shown in the FIG. 4, a view 402 comprises a cipher text part (or encrypted part) 406 and a perceptible (e.g., plaintext) part 408. A plaintext part 408 includes the TID, the DIDc of the payer 200 generating the view 402, and the local current timestamp (TS) of device 106. The TS, among other functions described herein, is also used to prevent transaction replay. The encrypted part 406 includes two critical fields: the agreement data and the DIDm of the payee's 202 device 106 involved in the agreement. The DIDm is the minimum necessary reference field in order to provide the desired verification properties of the UPTF protocol. Therefore, a user can execute a UPTD 106 cashless monetary transaction with a transaction party according to a PIE and a wireless wallet software 108 authentication parameter RSN and transaction messages comprising an identifier of the mobile phone, an identifier of the transaction party and an identifier for a transaction (for example, an identifier and/or other transaction related data such as payment amount, etc.) thereby providing the UPTD wireless wallet based upon a combination of the mobile payment software at the UPTD and STS association of the PIE and the software authentication parameter with financial entities of the user and exchange of the transaction messages between the user, the transaction party and the STS 120.

First, DIDc and the TS obtained from the UPTD's local clock (and/or as provided as a part of the agreement data), are utilized by the device's 106 pseudorandom number generator to generate a time-dependent RSN. Therefore, the parameters of the generator are particular to each device 106. The encryption key K is then generated from the RSN and user input PIE (shown in FIG. 4 with green coloring), where the PIE is generated by the STS 120 as shown in FIG. 1A. Firstly, the RSN and PIE are combined using a function F and then a hash function H is applied to the result (typically a string) to generate the encryption key:

$$K=H(F((\mathrm{PIE},\mathrm{RSN}))$$

A message digest function can be applied to the agreement data, the DIDm, and the DIDc to generate a MD of the view. The MD can further strengthen the security by ensuring that no other party has tampered with or modified the contents of the view 402 in any way. The encryption algorithm with the encryption key K is then applied to the MD, the agreement data, the DIDc, and the DIDm to generate the cipher text part of the view 402, as shown in FIG. 4 with yellow coloring. For further protection, the SAS protocol uses random message padding in order to further prevent "known-text" attacks. According to an aspect of the embodiment described herein, the embodiment uses Advanced Encryption Standard (AES) for encryption, a Keyed-Hashing for Message Authentication (HMAC)-based scheme for random number generation, and SHA1 Secure Hash Algorithm for the hash function.

The STS 120 has sufficient prior knowledge of the functions and specific parameters used by each device 106 in the encryption process, so that when combined with the plaintext portions of a message 402, 404, it is possible to decrypt the message 402, 404 by reversing the above process. For example, from the plaintext part 408 of the view 402, the STS 120 recovers the DIDc and TS, which are used to look-up the customer's 200 PIE and other parameters of the RSN generator that can be stored in the STS database 203. These are used to compute the RSN. The encryption key K can then be computed using the same method with which the customer UPTD 106 generates the encryption key. The cipher text part 406 of the view message 402 is then decoded.

After all applicable fields of the payer 200 view 402 are acquired, the STS 120 locates the payee's 202 view 404 for the same transaction, using the DIDm and TID included in the previously decoded payer 200 view 402. After going through a similar decryption process, the decoded fields of the agreement data of the payee 202 view 404 are compared with the corresponding fields from the payer 200 view 402. If all applicable corresponding fields match (correspond according to application design), the received views 402, 404 are considered verified. Further processing is then carried out and external executions are triggered as necessary.

Any responses from the STS 120 to the payer 200 or payee 202 are encrypted by the STS 120 using the same encryption methods and using the parameters for the destination devices 106, 302 and the TS of the original transaction. Only the intended recipient can decrypt the response message, insuring privacy protection and authentication of the STS.

Another example encryption key generation for the UPTF SAS is described herein. In FIG. 4, using the view 402, the key KEYc is a hash of a RSNc and a PIEc; the detailed key generation procedure is as follows:

The initialization data for the RSNc are created when a new UPTD account is created by the STS (e.g., when the code executable 108 is created by the STS 120 at operation 110 in FIG. 1A). Specifically:

1. a random 128-bit seed is generated using a software service function.

2. a random 160-bit initialization timestamp is created also at new UPTD account creation time, using software service function. Therefore, in FIG. 1A, at operation 110, the STS 120 generates device 106 specific initialization parameters of a random number and an initialization time stamp, both of which, at operation 114 are transmitted via the wireless wallet application 108 to the UPTD device 106 (e.g., mobile phone 106).

In FIG. 1A, at operation 110, the PIE is created by the STS 120 when a new account is created at the STS 120, as follows: a 32-byte random value is created using a software service function, convert each byte to a decimal value string, and concatenate them all to produce a long string. Randomly chop 4 digits from this string to create PIE.

When the key needs to be created in order to encrypt a transaction message, the following steps take place:

1. A 160-bit current timestamp is generated, as follows:

a. Convert current time to string, for example, converting the current time to a 16 characters string, e.g., 5:04 pm, Jan. 26, 2004 is written in "0000170401262004."

b. Take the string and a one way function to output another value, for example by hashing the current time string using SHA1 algorithm, which produces a 160-bit output.

2. XOR an init timestamp and current timestamp to produce a 160-bit output. This operation is essentially a form of deterministically calculating a difference between two values of time (i.e., a deterministic transformation between two values).

3. Use the 128-bit seed software authentication parameter as data, and the XORed value of the two time stamps as the key, compute the HMAC result (a 160-bit value). The result of the HMAC is the RSNc. Use of the HMAC accommodates unpredictability in the RSNc generation.

4. Chop the first 128-bit of the HMAC result, combine (e.g., concatenate) with the 32-bit PIE (convert from a 4 digit string) for a 160-bit value.

5. Compute the hash (SHA1) value of the 160 bit stream in operation (4), and chop the first 128 bit as the final key.

In the encrypted part of the message a hash of the transaction part of the message (with the padding) using SHA1 (alternatively a CRC can be used) is used.

In the above-described embodiment, the values of a number of bits are provided as unlimiting examples, and the present invention is not limited to a specific number of bits values. Therefore, as illustrated with reference to FIGS. 1, 2, 3 and 4, a UPTF SAS based transaction requires a device 106 which provides device-specific parameters that determine a device-specific and time-specific key and an operator for the device who provides a fixed PIE that is only known to the STS 120 and the operator. The combination of the two is required for an encrypted transaction request that can be validated by the STS 120. Intercepting one (or more) transaction message and successfully decrypting it would not be sufficient for purposes of inferring either the PIE, or the device specific parameters employed in the key generation process. Moreover, a single, time-dependant key is not re-usable because of the pair-wise agreement notion of transactions processed by the STS 120.

Accordingly, a system and method of generating, by the mobile phone, a first view of the mobile phone cashless monetary transaction, and transmitting the first view of the transaction to the STS according to the SAS; generating, independently by a party to the transaction, a second view of the transaction, and transmitting the second view of the transaction to the STS according to the SAS; and verifying, by the STS, the first and second views to authenticate the transaction, and causing, by the STS, execution of the transaction based upon the verifying. The first and second views are symmetrical and the SAS comprises generating as each independent view of the transaction an unencrypted perceptible part comprising an identification of a first mobile phone for the first view and a current timestamp, and an encrypted part by performing a combination of time and authentic mobile payment software dependent transformations based upon the PIE, on a transaction message comprising data of the transaction, the identification of the first mobile phone and an identification of a second mobile phone for the second view.

An authentic mobile phone wireless wallet software 108, which generates the UPTF SAS views, comprises therein software authentication parameters of an initialization time stamp and an initialization random seed number, and wherein the first and second views are symmetrical and the SAS comprises generating as each independent view of the transaction, an unencrypted perceptible part comprising an identification of a first mobile phone for the first view and a current timestamp, and an encrypted part by performing a combination of transformations based upon the PIE and the software authentication parameters included in the authentic payment software from the STS, on a transaction message comprising data of the transaction, the identification of the first mobile phone and an identification of a second mobile phone for the second view. The combination of transformations to encrypt comprises generating a transaction random sequence number based upon the software authentication parameters of the authentic payment software; and generating an encryption key based upon the transaction random sequence number and the PIE.

The generating of the encryption key further comprises generating a current time stamp; converting the current time stamp to a string; using a one way function, such as a hash function, to convert the current time stamp string to a current time stamp value; determining a time difference value between the current time stamp and the initialization time stamp; computing a Keyed-Hashing for Message Authentication (HMAC) result, based upon the initialization random seed number and the time difference value, to generate the transaction random sequence number; selecting a number of bits from the HMAC result as the transaction random sequence number and combining the selected number of bits f with the PIE; computing a hash value of the combination; and selecting a number of bits of the hash value to generate the encryption key. The number of bits is about 128.

Figure 5:
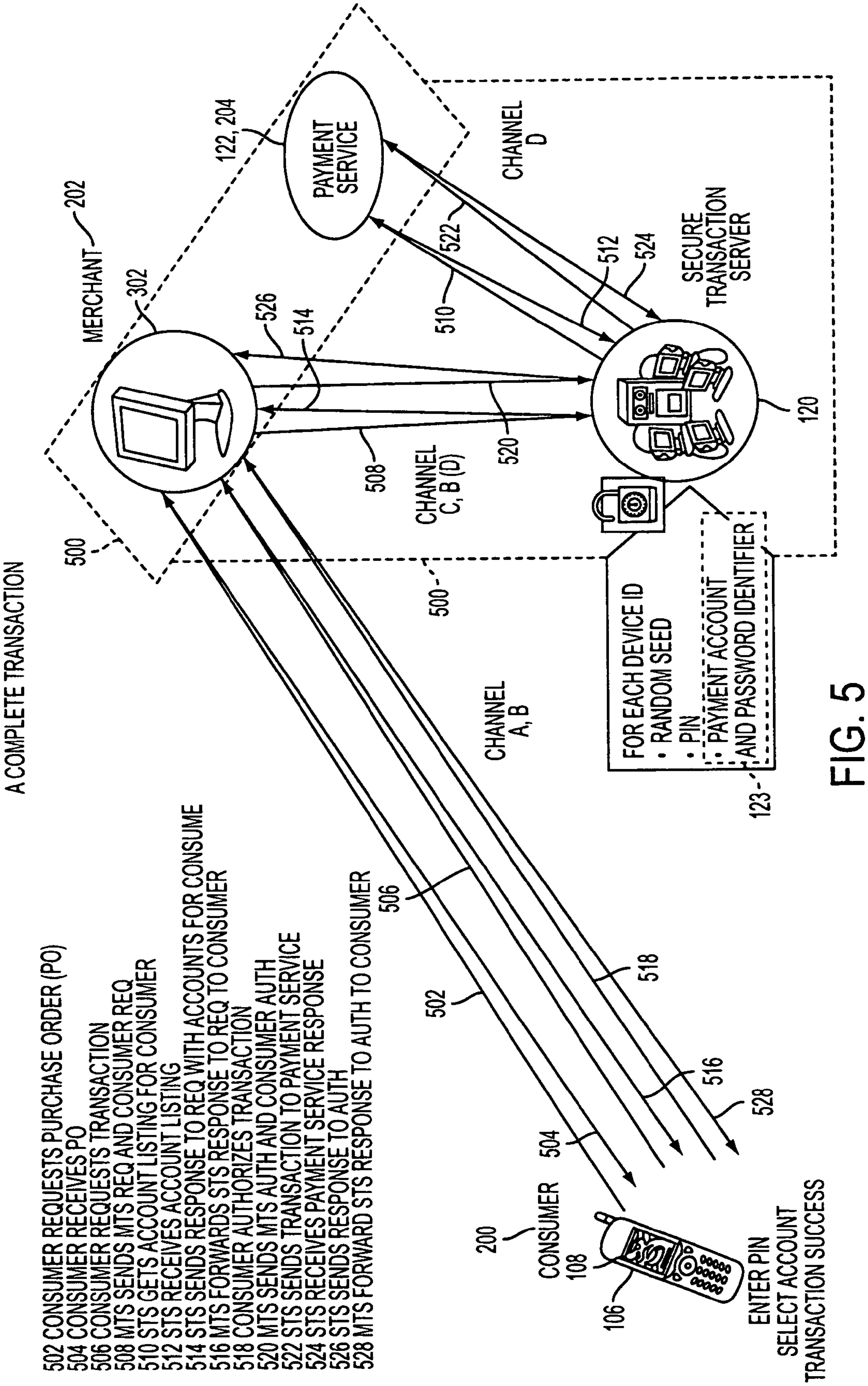
FIG. 5 is a flow chart of a UPTF based mobile phone cashless monetary transaction with a merchant, according to an embodiment of the present invention.

FIG. 5 is a flow chart of a UPTF based mobile phone cashless monetary transaction with a merchant, according to an embodiment of the present invention. A computer system is described that comprises an Online Payment Service (122, 204), a Secure Transaction Server (STS) 120, and a mobile phone wireless wallet application 108 comprising mobile phone specific electronic financial transaction initialization parameters, that is downloadable to a mobile phone 106 for consumers to execute a mobile phone cashless monetary transaction with a merchant, send money to other consumers using their mobile phone or for consumers to request money from other consumers using their mobile phone. When making payments using a mobile phone, the consumer can select any of the accounts registered with the online payment service 122, 204 to make the payment using that account.

An Online Payment Service (OPS) 122, 204 is a web accessible service that enables consumers to make payments to other consumers or merchants, or consumers or merchants to request payments from other consumers. In current Online Payment Services 122, 204, a consumer 200 identifies a merchant 202 or another consumer 200 by an e-mail address (or some other user identifier, such as a user name, etc.) that has been verified by the OPS 122, 204. Users 200, 202 of the OPS 122, 204 provide to the online payment service 122, 204 the information of their personal accounts (credit cards, bank accounts, etc.), so that any of those accounts can be used when making a wireless device cashless payment. The Secure Transactions Server (STS) 120 is a Universal Pervasive Transaction Framework (UPTF) based system that verifies transaction requests that observe the UPTF.

As also described above with reference to FIG. 1B, when the user is logged on, over the web, to the OPS 122, 204, the user might see an option that enables them to make payments or request payments from a mobile phone 106. Upon following the link associated with this option, the user will be asked for the phone number of the mobile phone 106 that she would like to use for such transactions and possibly the mobile carrier for that phone number. Upon submitting this information, the user will be shown a PIE to be used for making payments and requesting money from her mobile phone 106 and she will also receive a SMS (Short Messaging Service) message on the specified mobile phone, with a link that if followed will enable her to download to her mobile phone 106 the mobile phone wireless wallet software 108 that will enable her to make payments and request money using her mobile phone 106. The link points to a unique downloadable executable associated with this user at the STS 120 via the STS 120 maintained software authentication parameters and PIE. If the user has access to the web from the mobile phone 106, she will be able to follow that link and download the software 108 to the mobile phone 106. Upon completing the download of the mobile phone wireless wallet application 108, the user will be asked to save the application on the mobile phone 106. From that point on the application 108 is ready for use. The downloaded application can be referred to as mobile phone electronic wireless wallet 108. A consumer 200 who is also an OPS 122, 204 user and has downloaded a mobile phone wireless wallet 108 to her mobile phone 106 will be referred to as a mobile OPS user (as opposed to a OPS user). All mobile OPS users are also OPS users, so when using the term OPS users, it refers to both OPS users and mobile OPS users.

As discussed above with reference to FIG. 1A, the mobile phone wireless wallet software 108 is an executable written in a language that is installable and executable on the mobile phone 106, such as Java 2 Platform, Micro Edition (J2ME), Binary Runtime Environment for Wireless (BREW), any other language that might be installable on the mobile phone 106 so that applications written in that language can be executed on the mobile phone 106, or any combination thereof. The executable 108 is created by the STS 120 entirely, or at least partially as the STS 120 needs to create, store and retrieve data that is used to identify this executable 108 and the user associated with it for each future transaction. The STS 120 also creates and stores the PIE that is used for such transactions. The PIE is not stored on the executable 108 or the mobile phone 106 that this executable 108 will be eventually downloaded to. Only the software authentication parameters (operations 50, 52) are included in the mobile phone wireless wallet software 108.

Also, an OPS user can make a payment from the web-accessible OPS 122, 204 to a mobile OPS user, by using the mobile phone number of the mobile OPS user to identify the consumer who will receive the payment. Typically, OPS users identify other OPS users with an e-mail address. If an OPS user knows the mobile phone number of a mobile OPS user, she can identify that user by the mobile phone number and makes a payment to that user. Similarly if an OPS user wants to request money from a mobile OPS user, she will have to identify that user by a mobile phone number. In the latter case, the mobile OPS user might receive a SMS notification on her mobile phone notifying her that someone has requested money from her. The requestee can the use her mobile phone 106 to make a payment to that OPS user.

Also a mobile OPS user can use her mobile phone the make payments to other OPS users. If the payee is also a mobile OPS user, the payer can identify the payee by mobile phone number, although she can also identify that payee by e-mail address if she so chooses. Entering a phone number in a mobile phone is easier and faster than typing an e-mail address. If the payee was identified by phone number, the payee will receive a SMS notification about the payment. The payer also will receive a notification SMS if the payment is successful. The payer can select any of the OPS-registered accounts to make the payment from.

A mobile OPS user can also use her mobile phone to request a payment by an OPS user, by similarly specifying the OPS user by either e-mail address or mobile phone number if the user knows it. Requestor and requestee will receive a SMS message notifying them of successful request. Mobile OPS users can also view in their mobile phone a list of transactions that involved their mobile wireless wallet software 108 from a relevant menu of the application 108. This list can include all transactions that involved the mobile phone 106 in order to effect the transaction. Specifically, this includes payments that were made from the mobile phone 106 (including a payment made in response to a request for payment) and requests for payments to other OPS users. OPS users can view in the web-accessible OPS, a list of all transactions that they have performed, regardless of whether they were made from the web-accessible OPS or from their mobile phone 106.

Payments and request for payments from the mobile phone 106 using the mobile phone wireless wallet software 108 result in UPTF messages (e.g., 402, 404), encrypted according to UPTF, send by the mobile phone's 106 wireless wallet 108 to the STS 120 and/or generated by the STS 120 (i.e., in case of a person-to-person mobile phone payment, the STS may or may not create a second view for the payment transaction depending on system configuration and/or application design and/or transacting party preference). For example, in FIG. 5, in case of a member-to-member, as a person-to-person transaction example, cashless payment transaction involving one payment service 122, 204 in which both members have registered accounts, the merchant 202 transaction system 302 and the payment service 122, 204 could be logically (conceptually) one entity/system 500 for through processing (via a channel D between the OPS 122, 204 and the STS 120) the UPTF views 402, 404 to/from the STS 120. In general, in a person-to-person type transaction scenario, each transacting party creates its own view. In case of a payment by one person to another person using the mobile phone wireless wallet 106, because the other person (payee) may not require (or be required) to approve a payment made to the payee, the payee might not need to create a view to accept the payment. Therefore, in case of a payment transaction, the payee's view can be omitted and the STS 120 may simply only verify a first payment request view 402 from a payer 200, or the STS 120 may create the other person's (payee 202) second view 404 on the payee's behalf. Paired views 402, 404 are used in case of a plurality of online payment services 122, 204 to achieve person-to-person mobile payment transactions. According to an aspect of the embodiment described, the system 500 can also comprise the STS 120. Also, responses to messages from the STS 120 to a mobile phone 106 are UPTF SAS messages, encrypted according to UPTF SAS. The OPS 122, 204 has a secure connection (i.e., channel D) to the STS 120.

According to an aspect of the embodiment described herein, in case of person-to-person payment transaction, a payment action from the web-accessible OPS 122 (i.e., in case of a payment from a desktop to a mobile phone wireless wallet 106), 204 can be carried through the secure connection D to the STS 120 and need not be encrypted according to UPTF SAS. As discussed above, payment from the web-accessible OPS is effective immediately and does not require an action by the payee. Still, the STS 120 will receive that payment action, decrypt the payment action, which according to the UPTF SAS serves to authenticate the originating payment action requester, including the transaction, and will determine if the payee is a valid mobile OPS user, who is still active with the STS 120, and possibly notify the payee 202 mobile phone wireless wallet 106.

According to another aspect of the embodiment described herein, the STS 120 through the secure connection D between the STS 120 and the OPS 122, 204, can receive a request for payment to a mobile OPS user (i.e., in case of a request for payment from a desktop to a mobile phone wireless wallet 106). Upon receipt of the request the STS 120 will send a notification SMS to the mobile phone 106 of the mobile OPS requestee. When the mobile OPS user, using her mobile phone 106 and the mobile phone wireless wallet software 108 checks for pending requests she will see that request and can decide to make a payment to the requestor. Upon receipt of the payment message by the STS 120, the STS 120 will check against the pending request by the request, will determine according the UPTF methods that the complete transaction is valid and accordingly notify requestor and requestee.

According to another aspect of the embodiment described herein, a request for payment by a mobile OPS user that uses her mobile phone for that request, is handled similarly. If the requestee was identified as a mobile OPS user, the requestee will receive a notification SMS and will see the request upon checking for pending requests with the wireless wallet software 108 and can decide to complete a payment. The STS 120 will use the UPTF criteria to compare with the requestor's messages to the STS 120 and determine the validity of the complete transaction. Upon such determination the STS 120 will notify the OPS and the requestor and requestee.

All of the above described transaction examples, only require that the mobile OPS user use her mobile phone 106 and the mobile phone wireless wallet software 108 and entering the designated PIE for those transactions. The STS 120 and OPS 122, 204 may be operated by the same entity and/or execute in the same computer system, or they me be operated by different entities. According to an aspect of the embodiment(s) described herein, a user can be notified at the mobile phone wireless wallet 106 of a status (e.g., result, confirmation, state, success/failure, problem/help notification, etc.) of the mobile phone UPTF authenticable cashless monetary transaction using Short/Multimedia Message Service, email, and/or voice message.

Figure 6:
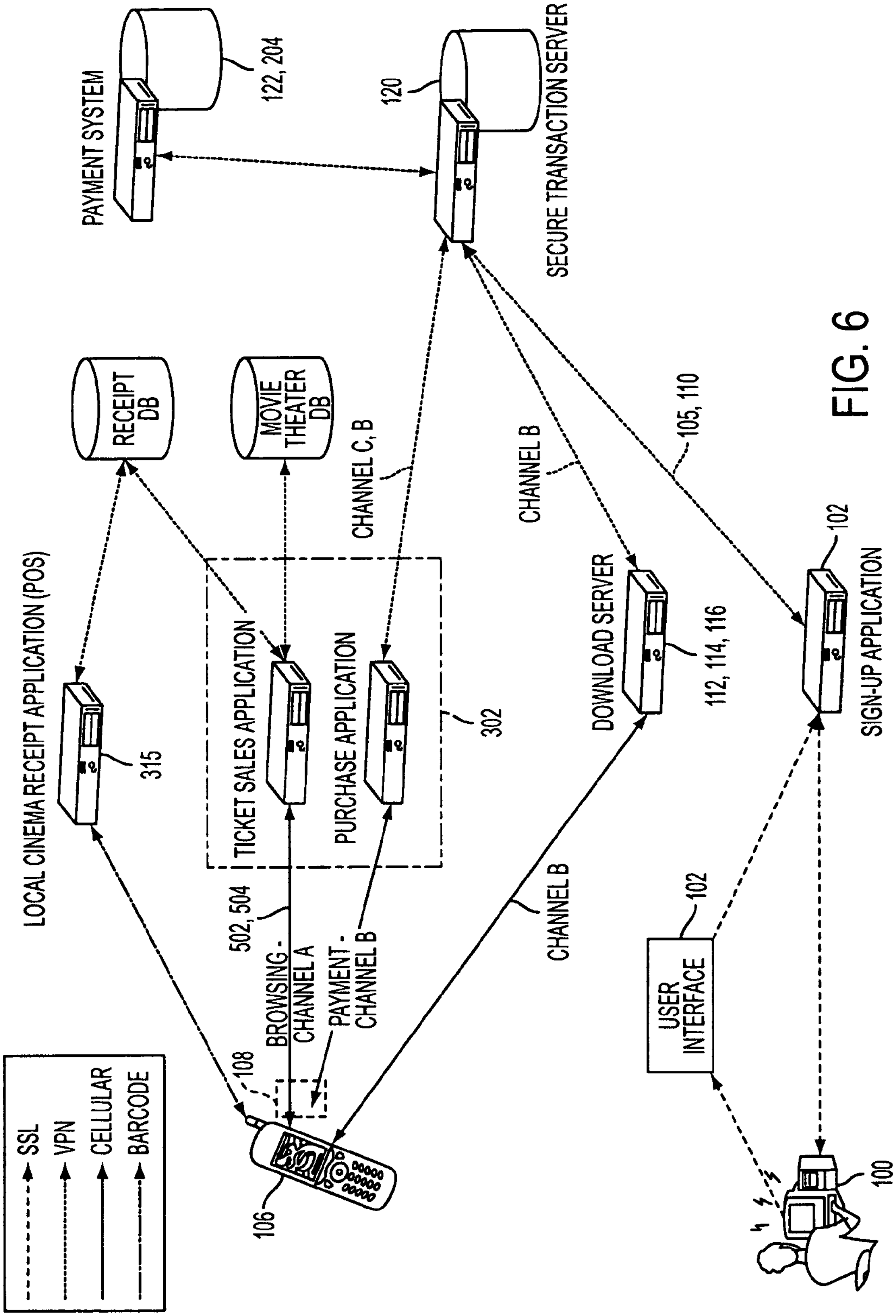
FIG. 6 is a flow chart of a UPTF based mobile phone cashless monetary transaction to purchase a movie ticket, according to an embodiment of the present invention.
Figure 7A:
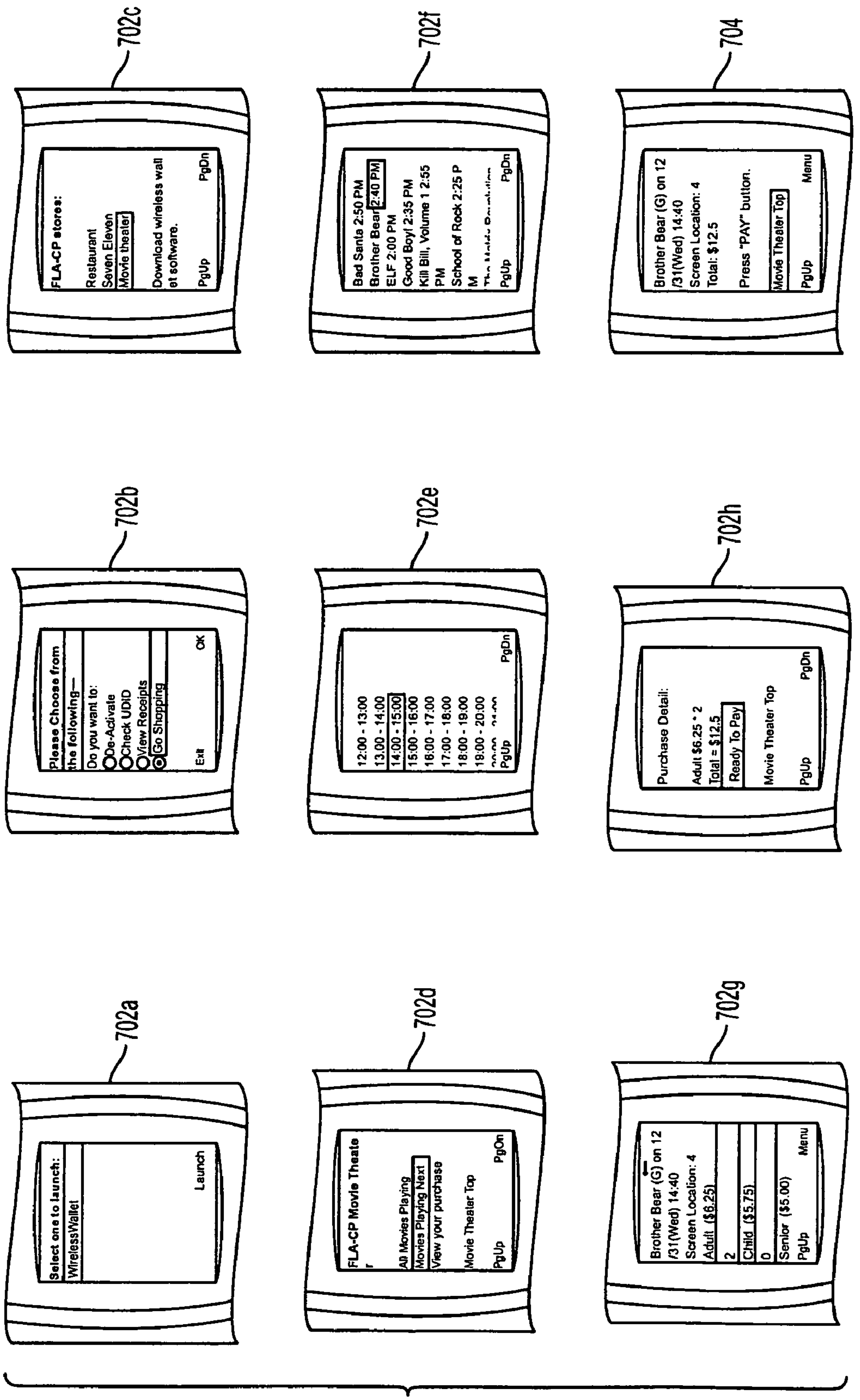
FIGS. 7A-B are mobile phone display screen user interface images to execute mobile phone cashless monetary transaction to purchase a movie ticket, and to obtain, store, and retrieve a transaction receipt, according to an embodiment of the present invention.
Figure 7B:
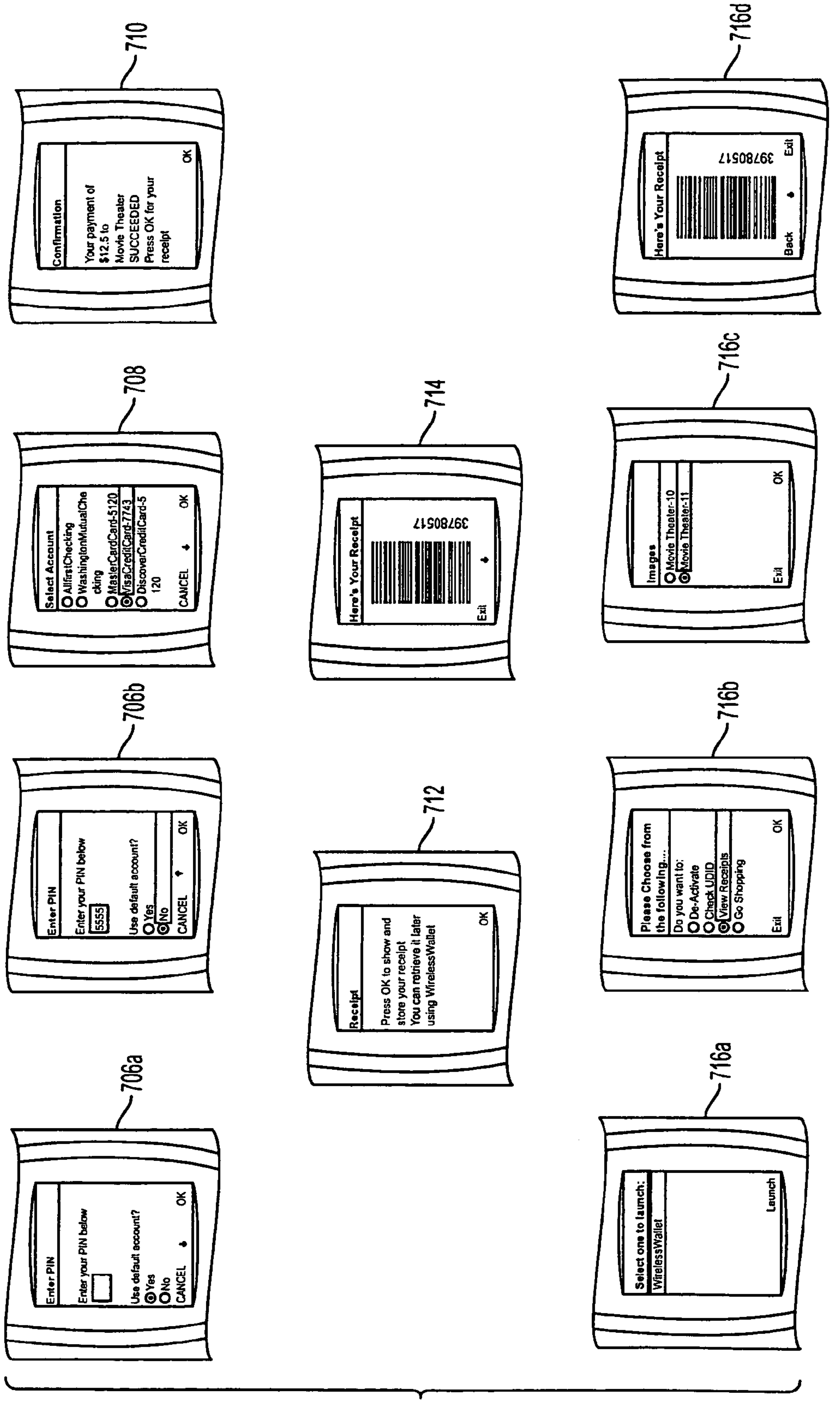

FIG. 6 is a flow chart of a UPTF based mobile phone cashless monetary transaction to purchase a movie ticket, according to an embodiment of the present invention. FIGS. 7A-B are mobile phone display screen user interface images to execute mobile phone cashless monetary transaction to purchase a movie ticket and to obtain, store and retrieve a transaction receipt, according to an embodiment of the present invention. With reference to FIGS. 5, 6, and 7A-7B, an example mobile phone cashless monetary transaction with a merchant is described. In FIG. 5, at operation 502, a mobile phone 106 user/consumer 200 uses an installed (FIGS. 1A, 1B, 1C) mobile phone wireless wallet 108 to request a purchase order from the merchant 302 payee 202. In FIGS. 5 and 6, operation 502 comprises binding the consumer 200 with the merchant 302 transaction information, for example, by browsing a merchant ticket sales application (merchant transaction server (MTS)) 302 (FIGS. 2, 3) for purchasing a movie ticket via a mobile phone (cellular) communication network. The binding of the user with a merchant's virtual shopping cart can also be performed by inputting at the mobile phone wireless wallet software 108 an identifier for the merchant (e.g., a POS 135 transaction paper receipt information) and/or the mobile phone wireless wallet might have pre-stored a merchant identifier (e.g., Internet Universal Resource Locator (URL) address). In FIG. 7A, for example, at operation 502, mobile phone user interface screen images 702*a-h* are displayed for browsing the merchant ticket sales application 302, which comprise, at 702*a*, selecting the mobile phone wireless wallet software 108, at 702*b*, selecting "Go shopping," at 702*c*, selecting "Movie Theater," at 702*d*, selecting "Movies Playing Next," at 702*e*, selecting movie times from displayed movie time information, at 702*f*, selecting a movie from displayed movies at the selected time, and, at 702*g*, completing a purchase order form request to be sent to the merchant 302, and, at 702*h*, transmitting to the merchant 302 the purchase order request, which is a binding of the consumer 200 with the merchant 302 transaction information by identifying what is being paid for (electronic shopping cart) and payment information.

At operation 504, the mobile phone wireless wallet software 108 receives a purchase order from the merchant ticket sales application 302, which, for example, can result in mobile phone user interface screen image 704 that displays a summary of the electronic shopping cart, including payment information, from the merchant 302, and a "Please press PAY button" selection. According, to an aspect of the invention, at operation 504, information used as a device identifier of the merchant (DIDm) (FIG. 4) can be identified by the mobile phone wireless wallet 108 based upon the purchase order received from the merchant 302 payee 202.

At operation 506, selection of the "PAY" button at 704 begins the UPTF SAS functions of the embodiment. In particular, via the mobile phone user interface screen images 706*a*, 706*b*, the mobile phone wireless wallet software 108 requests input of the PIE (e.g., a PIN) and generates a UPTF SAS view 402 (as described with reference to FIG. 4), as a consumer 200 REQuest transaction, and transmits the REQuest transaction to the merchant 302. As shown in FIG. 6, the UPTF SAS based messages 402 from the mobile phone wireless wallet software 108 are carried over the mobile carrier's network, either directly to the STS 120 or indirectly through the merchant application 302, as indicated by Channel B. The transport layer between client 108 and MTS 302 and/or STS 120 uses Internet (Internet Protocol) HTTP communication. However, the transport layer can by any known transport layer, such as HTTP, web service calls, socket based communication, etc. According to an aspect of the embodiment(s) described herein, the MTS 302 is implemented with a web interface for sending and receiving messages from and to the mobile phone client 106; specifically the mobile phone wireless wallet software client 108 running on the mobile phone 106 sends its messages to the MTS 302 by submitting them to a pre-specified CGI-like interface, and the MTS 302 forwards/receives the same/responses to/from the STS 120 using web service calls. In other words, a UPTF message is an HTTP parameter. Since HTTP is stateless, the MTS 302 uses a small database to keep track of state(s) during the sending and receiving the messages. Also, because messages are carried over HTTP, a hex encoding of the encrypted UPTF SAS based message is used to avoid problems with special ASCII characters in the encrypted form of the message, as it is transported over HTTP.

At operation 508, the MTS 302 generates an MTS UPTF SAS view 404, as an MTS REQ, and transmits the MTS REQ and the Consumer REQ (i.e., views 402, 404) to the STS 120. According to an aspect of the embodiment, at operation 506, information used as a device identifier of the consumer (DIDc) is obtained by the MTS 302 from the unencrypted part of the consumer REQuest view 402, based upon which the MTS 302 generates the MTS REQuest view 404.

At operation 510, the STS 120 gets abstracted account listing for the consumer 200 from the payment service 122, 204. In particular, if at 706*b*, the consumer 200 inputs a request to use a financial account other than a default account, the consumer REQuest view 402 includes a request for financial account information. At operation 510, the STS 120 uses an account association 123 for the consumer 200, which is provided from the payment service 122, 204 (i.e., operations 105 in FIG. 1A), to confirm the consumer REQuest with the payment service 122, 204. At operation 512, the STS 120, receives an account reference listing (not actual account numbers) from the payment service 122, 204. At operations 514, 516, the STS 120 forwards via the MTS 302, an STS Response to the consumer REQuest view 402, which includes the account reference listing. At operation, 516, the mobile phone user interface screen image 708 displays a selectable user account reference listing. At operation 518, the consumer 200 authorizes the transaction. At operation 520, the MTS 302 sends an MTS authorization and the consumer authorization to the STS 120.

At operation 522, in response to the MTS and consumer authorization requests of operation 520, the STS 120 sends an AUTHorization transaction to payment service 122, 204 and, at operation 524, receives a payment service response. At operation 526, the STS 120, forwards to the MTS 302 the payment service response to the AUTHorization transaction, which, at operation 528, the MTS 302 forwards the STS response to AUTHorization transaction to the consumer 200. In particular, at operation 528, the mobile phone user interface screen image 710 displays a transaction success confirmation message. Accordingly, at operations 508 and 520, the STS 120 receives and verifies the UPTF SAS based merchant and consumer views 402, 404 (e.g., decrypting and cross-referencing the UPTF SAS based MTS REQ and consumer REQ messages and the MTS AUTH and consumer AUTH messages).

According to an aspect of the described embodiment herein, the wireless wallet application 108 running on the mobile phone 106 receives receipt related information, as shown in the display screen image 712, which according to an aspect of the embodiment is in the form of a barcode image on a computer display screen, as shown in a barcode image 714 displayed on the mobile phone display screen 106, after every successful purchase and stores these receipts on the mobile phone 106 for further reference and reuse (e.g., to be displayed on a display screen of the mobile phone wireless wallet 106 and read from the computer displayed barcode image by a barcode reader 315 to gain physical access to the paid service at a physical merchant service spot, such as a cinema point of sale (POS) 315). The transaction receipt related information could be remotely stored and retrievable. Therefore, the wireless wallet application 108 provides transaction receipt management and in FIG. 7B, an example of mobile phone display screen user interface images 716*a-d* is illustrated for retrieving transaction receipt related information. According to another aspect of the embodiment(s) described herein, provided is a system and method of notifying the user at the mobile phone of a status of the mobile phone UPTF authenticable cashless monetary transaction using Short/Multimedia Message Service, email, and/or voice message, including transaction receipt information, wherein the receipts can be forwarded to another (e.g., in case of a movie ticket purchase, a barcode image movie ticket receipt delivered to the mobile phone wireless wallet 106 can be forwarded to another person for theater entry). Therefore, the wireless wallet software 108 includes a general receipt management mechanism based upon a computer display screen image of a barcode 714. In FIG. 6, the VPN is a Virtual Private Network.

The wireless wallet application 108 running on the mobile phone 106 combines both a browser and a payment application. The browser (lightweight web client) is used for purchasing and the payment application component is used for executing a UPTF SAS transaction.

Figure 8:
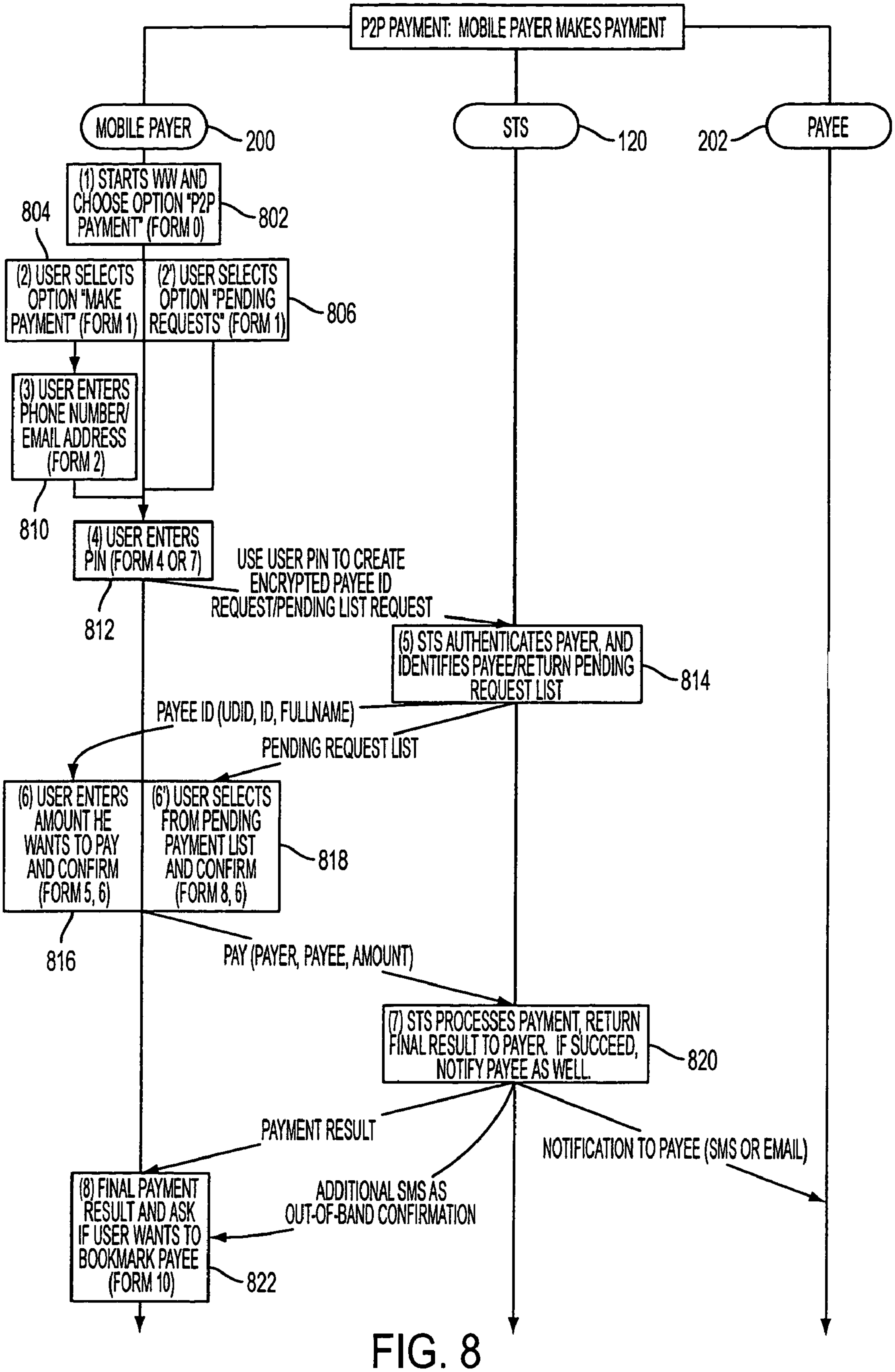
FIG. 8 is a flow chart based upon mobile phone display screen user interface images and message flow between a requestor device, a secure transaction server (STS) and a requestee to execute a person-to-person mobile phone cashless payment transaction, according to an embodiment of the present invention.
Figure 9:
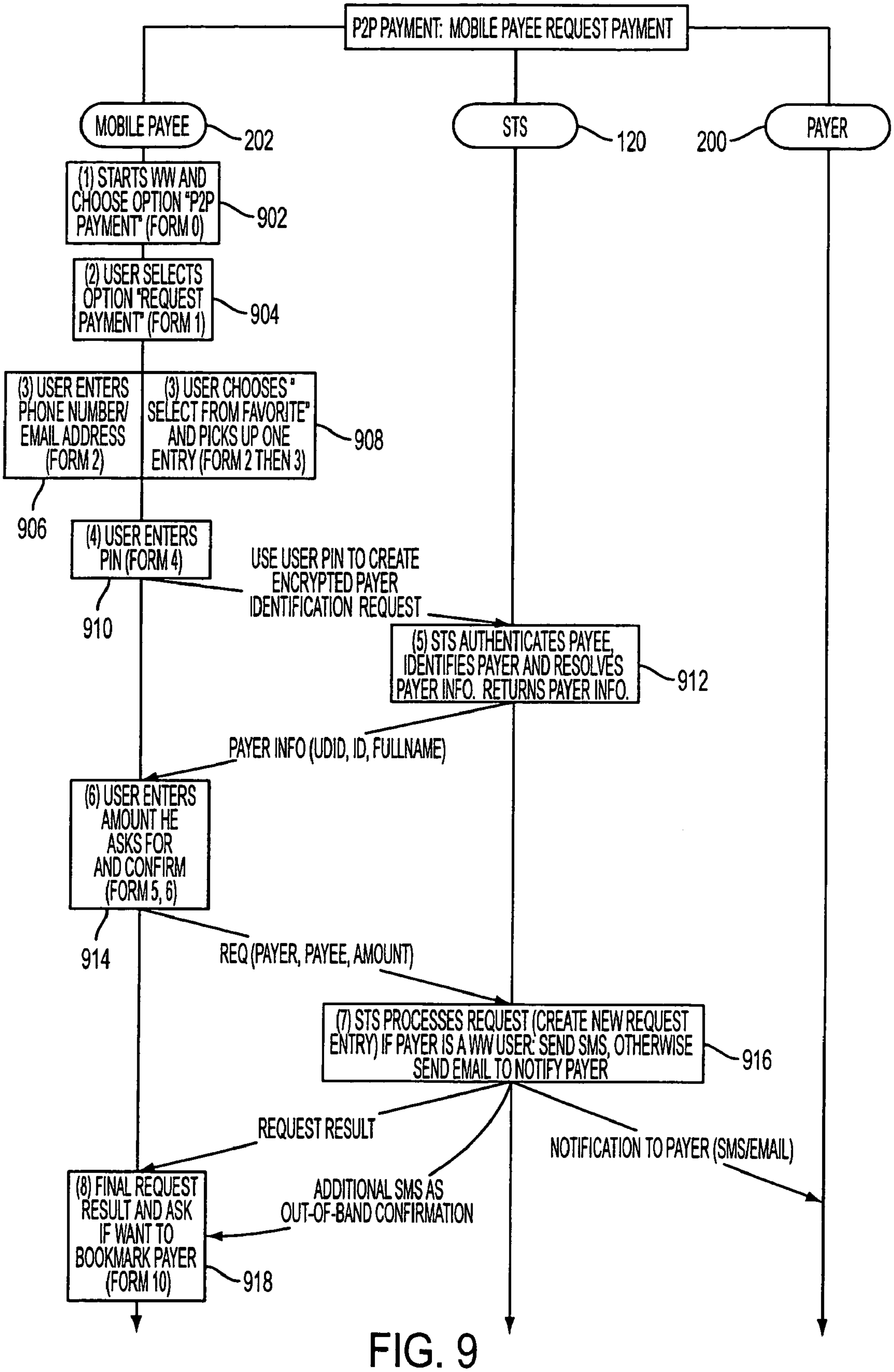
FIG. 9 is a flow chart based upon mobile phone display screen user interface images and message flow between a requester device, a secure transaction server (STS) and a requestee to execute a person-to-person mobile phone cashless payment request transaction, according to an embodiment of the present invention.
Figure 10:
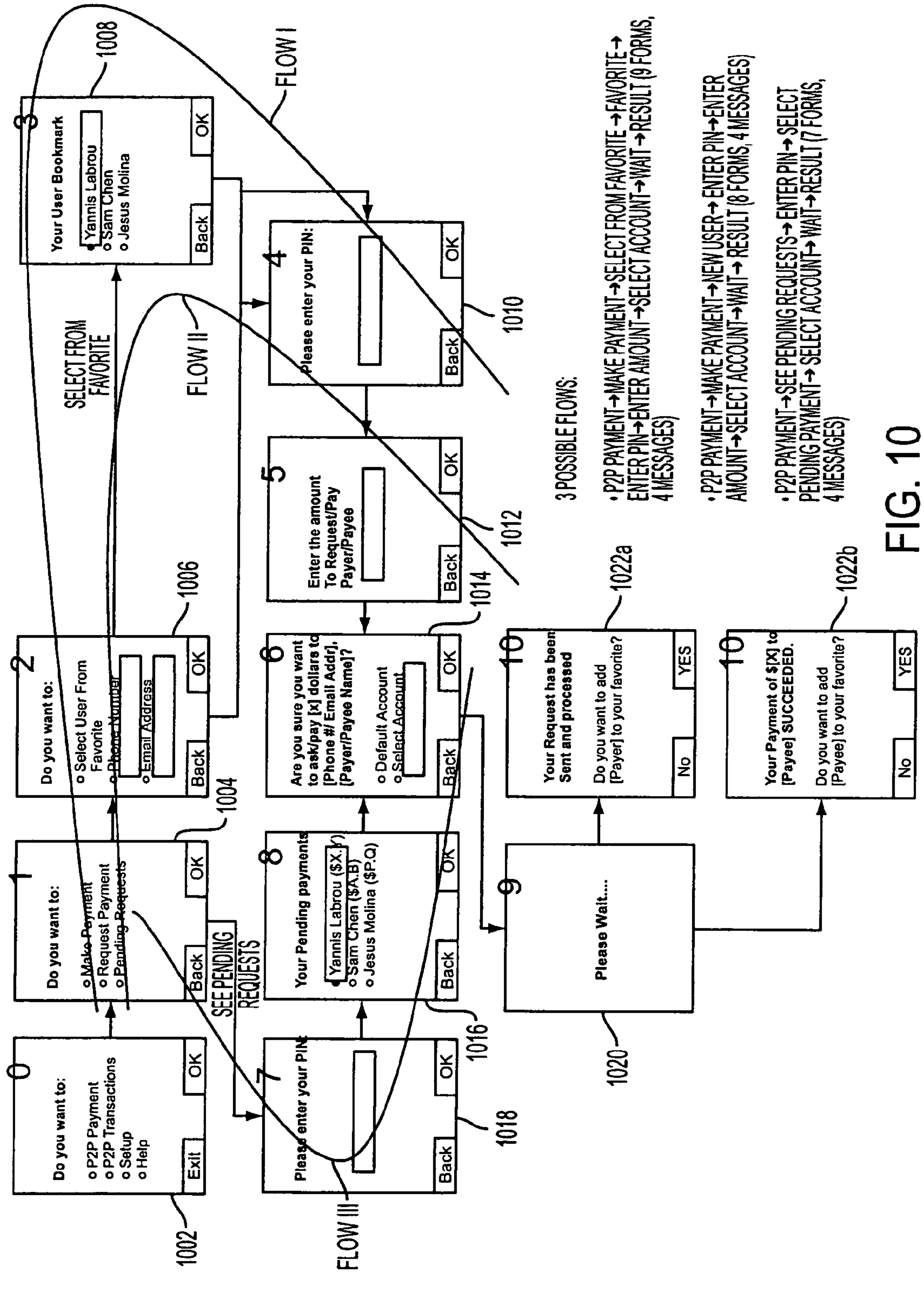
FIG. 10 is overall mobile phone display screen user interface images and possible workflows available to an operator of a wireless wallet on a mobile phone to execute peer-to-peer cashless monetary transactions, according to an embodiment of the present invention.
Figure 12:
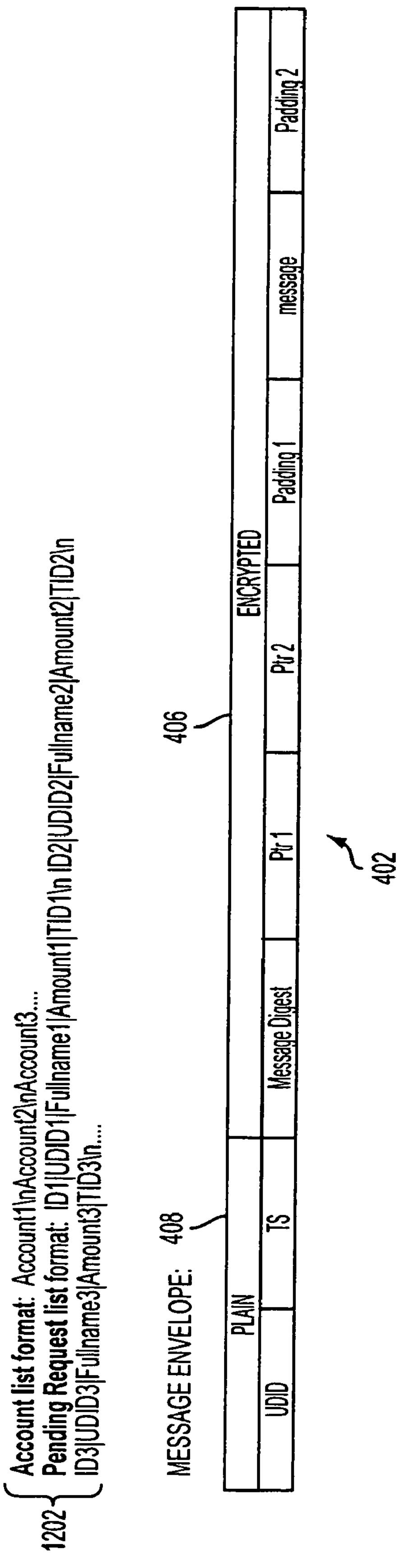

FIG. 8 is a flow chart based upon mobile phone display screen user interface images and message flow between a requestor device, a secure transaction server (STS) and a requestee to execute a person-to-person mobile phone cashless payment transaction, according to an embodiment of the present invention. FIG. 9 is a flow chart based upon mobile phone display screen user interface images and message flow between a requestor device, a secure transaction server (STS) and a requestee to execute a person-to-person mobile phone cashless payment request transaction, according to an embodiment of the present invention. FIG. 10 is overall mobile phone display screen user interface images and possible workflows available to an operator of a wireless wallet on a mobile phone to execute person-to-person cashless monetary transactions, according to an embodiment of the present invention. FIGS. 11-12 are diagrams of mobile phone person-to-person cashless monetary transaction message formats to execute various mobile phone cashless monetary transactions, according to an embodiment of the present invention. An example of a person-to-person payment and a person-toperson payment request will be described with reference to FIGS. 8, 9, 10 and 11. FIG. 8 is a flow chart of a person-to-person payment when a mobile phone payer 200 makes payment via a payment request or via responding to a received request for payment from a payee 202. In FIG. 8, at operation 802, a mobile OPS payer 200 starts the mobile phone wireless wallet 108 and chooses option "P2P Payment," corresponding to the mobile phone user interface display screen image 1002 (Form 0). At operation 804, the user selects option "Make Payment," corresponding to the mobile phone user interface display screen image 1004 (Form 1). Also, at operation 806, the user can select option "Pending Requests," corresponding to the mobile phone user interface display screen image 1004 (Form 1). If, at operation 804, the user selects "Make Payment," at operation 810, the user is prompted, via the mobile phone user interface display screen image 1006 (Form 2), to enter a phone number/email address. After operation 804 and operation 806 (as the case may be), the user is prompted, via the mobile phone user interface display screen images 1010 (Form 4) or 1018 (Form 7), to enter a PIE, such as a PIN. At operation 812, when the user enters the PIN, the mobile phone wireless wallet software 108 uses the input PIN to create encrypted payee id request/pending list request (as the case may be) according to UPTF SAS message view 402 and sends the message view 402 to the STS 120. At operation 814, the STS 120 receives the message views 402 and authenticates the user payer 200, and identifies payee 202/returns a pending request list (as the case may be).

At operation 814, the STS 120 creates and transmits response requests to a "payment request" or a "pending payment request list," according to UPTF SAS message views 402. At operation 816, in case of a "payment" transaction, the mobile phone wireless wallet software 108 receives from the STS 120 a payee id (e.g., udid, id, fullname), and the user is prompted, via the mobile phone user interface display screen images 1012, 1014 (Forms 5, 6), respectively, to enter amount the user payer 200 wants to pay and confirm. At operation 818, in case of a "pending payment requests" transaction, the mobile phone wireless wallet software 108 receives from the STS 120 a pending payment request list, and the user is prompted, via the mobile phone user interface display screen images 1016, 1018 (Forms 8, 6), respectively, to select from a pending payee payment request list and confirm. At operation 814, for a make payment transaction, if a payee 202 confirmation message view 404 is not required, the STS 120 only authenticates payer 200 message view 402 and identifies payee 202. At operation 814, for a make payment transaction in response to a payment request from another person, the STS 120 verifies both message views 402, 404 of the payer 200 and the payee 202, respectively, according to the UPTF SAS.

At operations 816 and 818, the mobile phone wireless wallet software 108 sends a payment message view 402 that comprises payer, payee and amount information, and, at operation 820, the STS 120 receives and processes the payment message view 402 (display screen image 1020), and returns a final result to payer 200. If the payment transaction is successful, the payee 202 can be notified as well. In particular, at operation 822, the mobile phone wireless wallet software 108 receives a payment result message view 402 and informs the user payer 200, via the mobile phone user interface display screen image 1022*b* (Form 10), of the payment result and ask if the user wants to bookmark payee. At operation 820, a notification to payee 202, via SMS or email, can be sent.

FIG. 9 is a flow chart of a person-to-person payment when a mobile phone payee 202 requests payment from a payer 200. In FIG. 9, at operation 902, a mobile OPS payee 202 starts the mobile phone wireless wallet 108 and chooses option "P2P Payment," corresponding to the mobile phone user interface display screen image 1002 (Form 0). At operation 904, the user selects option "Request Payment," corresponding to the mobile phone user interface display screen image 1004 (Form 1). At operation 906, the user is prompted, via the mobile phone user interface display screen image 1006 (Form 2), to enter a phone number/email address for the payer 200. Also, at operation 908, the user can be prompted, via the mobile phone user interface display screen images 1006 and 1008 (Forms 2 and 3), respectively, to select a payer 200 from a favorite list. After operation 906 and operation 908 (as the case may be), the user is prompted, via the mobile phone user interface display screen image 1010 (Form 4), to enter a PIE, such as a PIN. At operation 910, when the user enters the PIN, the mobile phone wireless wallet software 108 uses the input PIN to create encrypted payer identification request according to UPTF SAS message view 402 and sends the message view 402 to the STS 120. At operation 912, the STS 120 receives the payer identification request message view 402 and authenticates the user payee 202, identifies payer 200 and resolves payer 200 information and returns payer 200 information to the mobile phone wireless wallet software 108.

At operation 912, the STS 120 creates and transmits response requests according to UPTF SAS message view 402. In particular, at operation 912, the STS 120 creates a payer 200 information (e.g., udid, id, full name) response message view 402. At operation 914, the mobile phone wireless wallet software 108 receives from the STS 120 the payer 200 information (e.g., udid, id, fullname), and the user is prompted, via the mobile phone user interface display screen images 1012, 1014 (Forms 5, 6), respectively, to enter amount the user payee 202 asks to be paid from the payer 200 and confirm.

At operations 914, the mobile phone wireless wallet software 108 sends a payment request from payer 200 message view 402 that comprises payer, payee and amount information, and, at operation 916, the STS 120 receives and processes the payment request from payer 200 message view 402 (display screen image 1020). At operation 916, the STS 120 processes (i.e., decrypting according to SAS and logging) the received payment request from the mobile phone wireless wallet software 108 by creating a new payment request entry for the payer 200, which can be requested by the payer via operation 806. In particular, at operation 916, the STS logs a transaction identifier of the message view 402, and with reference to FIG. 8, at operation 806, the payer 200 can select "Pending Payment Requests" to receive the created payment request, including the transaction identifier, of operation 916. In FIG. 8, via operations 812, 814 and 816, the payer 200 creates a corresponding agreement view 404, including the transaction identifier of the payment request, which corresponds to the created payment request of operation 916 and can be processed by the STS 120 according to UPTF SAS by decrypting and verifying both views 402, 404 of the payer 200 and payee 202, respectively. At operation 916, if payer 200 is a mobile phone wireless wallet software 108 user, SMS can be sent to the payer 200 or otherwise an email notification can be sent to the payer 200. At operation 916, the STS 120 returns a request result to payee 202. In particular, at operation 918, the mobile phone wireless wallet software 108 receives a payment request result message view 402 and informs the user payee 202, via the mobile phone user interface display screen image 1022*a* (Form 10), of the payment request result and ask if the user wants to bookmark payer.

More particularly, FIG. 11 is a format diagram of six example mobile phone person-to-person cashless monetary transaction message views 402, 404, including unencrypted part 408 and encrypted part 406, for executing mobile phone person-to-person payment transactions. In FIG. 11, according to an aspect of the embodiments described herein, messages A and C are informational message views that are essentially SAS messages (encrypted according to SAS, which authenticates a sender of a message and the content). Responses from the STS 120 to the mobile phone wireless wallet 106 (messages B, D, and G) are also SAS messages (encrypted according to SAS, which authenticates a sender of a message and the content) (i.e., the messages are encrypted with a generated key (FIG. 4) corresponding to the device 106, even though the messages are sent by the STS 120, thus from the device 106 perspective, authenticating the sender (the STS 120 in this case) and the content, because only the corresponding device 106 with the installed authentic wireless wallet software 108 (via software authentication parameter(s) and the STS 120 can possibly successfully reconstruct the key used for encrypting a message at a particular time (timestamp). Messages E/F are essentially agreement message views (a transaction message, including a transaction identifier, for an agreement that involves or relates to two or more parties) that comply with UPTF and are also secured according to SAS encryption, hence UPTF SAS. Therefore, in the embodiments described herein, mobile phone transactions are executed according to SAS as well as UPTF SAS. For example, message A is a pending payment request list message view 402 created at operation 806, which is provided after operation 812 to the STS 120. Message B is a pending payment request list reply message view 402 created at operation 814 by the STS 120. Message C is a person (e.g., peer) identification request message view 402 created at operation 810 by the mobile phone wireless wallet 108, which is provided after operation 812 to the STS 120. Message D is a person (e.g., peer) identification reply message view 402 created by the STS 120 at operation 814, which is transmitted to the mobile phone wireless wallet software 108 at operation 816. Messages E/F are make payment request/request payment request message views 402 created by the mobile phone wireless wallet software 108 at operations 816 and 818, respectively, and transmitted to the STS 120 for processing at operation 820. Message G is a transaction result message view 402 created by the STS 120 at operation 820, which is transmitted to the mobile phone wireless wallet software at operation 822.

FIG. 10 illustrates and describes three possible flows for mobile phone user interface display screen images. In FIG. 10, flow I is mobile phone user interface display screen images 1002, 1004, 1006, 1008, 1010, 1012, and 1014. In FIG. 10, flow II is mobile phone user interface display screen images 1002, 1004, 1006, 1010, 1012 and 1014. In FIG. 10, flow III is mobile phone user interface display screen images 1002, 1004, 1018, 1016 and 1014. FIG. 12 is a diagram of an example envelope of a mobile phone cashless monetary transaction message view 402 for a pending payment request list reply (Message B in FIG. 11). In FIG. 12, the message B view 402 is according to the SAS. The “message” portion contains an actual content of a message, as encrypted according to SAS. FIG. 12 shows example of message B (FIG. 11) for a Pending Payment Request List Reply. The message format 1202 is an example format of the “message” portion for a Pending Payment Request List Reply message B sent by the STS 120 in reply to message A. The message format 1202 comprises a list of pending payment requests and a list of abstracted account identifiers to select from for payment. Padding 1 and padding 2 can be random numbers to hide location of the “message” portion. Ptr1 and ptr2 are pointers indicating where the “message” portion begins.

A true mobile (service spot independent) electronically anonymously authenticable wireless wallet 106 is provided in which the user does not carry any financial account information, the mobile device does not temporally and/or permanently store any actual user financial account information, the mobile device does not require/need to be swiped over and/or even interface with a point of sale (POS) reader (i.e., a user is not bound to a payee location) to execute mobile authenticable cashless monetary transactions, and no bank card swiping is performed by the user at the mobile device and/or via the mobile device. A mobile phone, comprises a computer readable medium storing a mobile payment software initialized at a secured transaction server (STS) with a software authentication parameter, as an authentic mobile payment software; and a programmed computer processor executing the authentic mobile payment software controlling the mobile phone according to a process comprising prompting a user to input a personal identification entry (PIE) that is correlated by the STS with a phone number of the mobile phone and the authentic mobile payment software, and generating according to the PIE and the software authentication parameter a transformed authenticable mobile phone cashless monetary transaction, as a mobile phone wireless wallet of the user of the mobile phone, thereby accommodating mobile phone UPTF SAS based transactions.

Although the above-described embodiments are directed to mobile phone user electronically authenticable cashless monetary transaction, the embodiments are not limited to cashless monetary transactions, any type of user electronically authenticable transaction can be accommodated. The user mobile phone wireless wallet 106 provides an always-on, always-available, always-accessible “footprint” for accessing, delivering and paying (for) services with selectable accounts. The “footprint” is an authentic mobile phone wireless wallet application 108 according to a mobile phone application platform, such as J2ME, and running on a consumer’s mobile phone 106. The authentic mobile phone wireless wallet application 108 can be distributed and managed directly by the “business” without the collaboration, participation and consent of a mobile phone communication carrier. The services that include “sensitive” data, such as payment, are securely accessible by the user, with a simple user maintained (i.e., not permanently stored on the mobile phone 106) identifier, such as a 4 digit PIN. Further, a provider-controlled “footprint” for additional services beyond payment can be accommodated.

For example, in case of a movie ticket purchase service using the user mobile phone wireless wallet 106, a main service would be payment for movie ticket at any location (mobile) and redemption at a service spot in the movie theater to gain entry admission. Some example additional services can be browsing movie schedules prior to purchasing, rating of movies for a reward (discount) to be applied towards future purchases, loyalty programs with immediate awards, download previews, and provide notifications of movie times based on customer profile. Also, ability to send notifications (SMS) for promotions/advertisements that are accessible once starting the mobile phone wireless wallet application 108 and/or redeemed with the wireless wallet application 108 (e.g., in combination with payment towards something that is paid for and the promotion is applied towards).

Other example mobile phone wireless wallet application 108 services comprise financial related transactions for person-to-person and customer-online merchant. Additional services can be online auction related services, such as initial informational services for an online auction service customer, checking watched auctions, etc., and payment to another transaction party for a successful bid. Also, ringtone, game, digital/media content, software, advertisements, coupons, etc. rewards mechanism (or credits for ringtone, game, digital content/media, software, etc. purchasing) can be provided in connection for mobile to mobile payments using the mobile phone wireless wallet application 108. More particularly, according to an aspect of the embodiment(s) described herein, a system and method is provided that ties transactions with a wireless wallet 106 (e.g., wireless wallet software 108 payment transactions/purchases) to a reward system for receiving/purchasing mobile phone related items, such as ringtone, game, digital/media content, software, etc. According to another aspect of the embodiment described herein, a mobile phone reward system and method is provided in which a reward is immediately deliverable to a mobile phone, for example, after completion of a wireless wallet 106 payment, an automatic ringtone download, via a mobile phone communication network, to the mobile phone 106. The mobile phone wireless wallet application 108 makes the process of earning and redeeming credits much easier. Customers can be online payment services, banks, credit card companies, online merchants, and/or physical merchants using a mobile phone wireless wallet 106 as a point of sale (POS).

Other example mobile phone wireless wallet application 108 services comprise ordering and payment for medical prescriptions and refills prior to pickup at an authorized merchant. Additional services of notification (SMS) of refill due, when ready for pickup, rewards, transfer prescriptions by providing doctor's identifier and prescription number from mobile phone and incorporating validation of doctor and prescription.

Other example mobile phone wireless wallet application 108 services comprise payment, in-store, using the store loyalty card with the mobile phone wireless wallet 106, along with additional services of augmenting a royalty program, delivering and accessing rewards, coupons, etc. and redeeming.

Other example mobile phone wireless wallet application 108 services comprise various types of financial transactions, such as browsing accounts, funds, stocks, selling, buying, transferring stocks/funds/bonds using funds, broker accounts, banks, debit/credit cards. Additional services of notification onto the mobile phone wireless wallet 106 if stock meets price range, delivering and accessing recommendations, reports, analysis, trends, tracking, and voice activation.

The above-described processes of the present invention are implemented in software and/or computing hardware. The embodiment(s) described herein can be thought of as a server-side wallet to which access can be controlled through a four digit PIN, with the UPTF notions of multi-party agreements and time-of-transaction dependent key generation combining to provide expected security properties. The combined solution does not require any storage of critical data on the mobile device, it does not impose special hardware requirements and "reduces" security to a 4-digit PIN which is a major convenience for the user. The mobile phone wireless wallet described herein is computationally fast; on mobile phones the key generation and encryption (or decryption) (i.e., SAS portion) can take approximately 100 ms on a fast available mobile phone (approximately 500 ms on a slow mobile phone) using J2ME for 160-bit AES encryption for each message. Thus, the security-related computational time is non-noticeable with respect to the transaction time (time it takes for messages to travel over a communication link).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for cashless transactions using a mobile phone communicably connectable with a secure transaction server (STS) over a mobile phone network, comprising:

initializing by the STS a mobile payment software with a software authentication parameter including one or more of an initialization time stamp and/or initialization random seed number, to provide an authentic mobile payment software based upon the software authentication parameter;

correlating, by the STS, a personal identification entry (PIE) with the authentic mobile payment software;

executing, by the mobile phone, the authentic mobile payment software for prompting a user to input the PIE to the authentic mobile payment software;

receiving the PIE and generating, by the mobile phone, according to both the received PIE and the software authentication parameter, a changing encryption key that changes for each transaction message by generating a transaction random sequence number based upon the software authentication parameter of the authentic payment software and generating the changing encryption key based upon both the transaction random sequence number generated based upon the software authentication parameter and the received PIE;

encrypting a transaction message for an authenticable mobile phone cashless monetary transaction;

transmitting, by the mobile phone, the encrypted transaction message to the STS;

decrypting, by the STS, the encrypted transaction message by generating the changing encryption key based upon the PIE correlated with the authentic mobile payment software; and authenticating the mobile phone cashless monetary transaction according to the decrypted transaction message.

2. The method of claim 1, further comprising implementing the authentic mobile payment software according to an application platform of the mobile phone.

3. The method of claim 1, further comprising implementing the authentic mobile payment software according to Java 2 Platform Micro Edition (J2ME) and/or Binary Runtime Environment for Wireless (BREW).

4. The method of claim 1, further comprising:

providing to the mobile phone a download link to the authentic mobile payment software; and downloading to the mobile phone the authentic mobile payment software via the download link, thereby performing the installing of the authentic mobile payment software.

5. The method of claim 4, wherein the authentic mobile payment software downloaded link is transmitted to the mobile phone using short/multimedia message service.

6. The method of claim 1, wherein the mobile phone authenticable cashless monetary transaction is performed according to Universal Pervasive Transaction Framework Secure Agreement Submission (UPTF SAS) protocol.

7. The method of claim 1, wherein the authenticable mobile phone cashless monetary transaction is performed according to Universal Pervasive Transaction Framework Secure Agreement Submission (UPTF SAS) protocol, wherein the initializing of the authentic mobile payment software comprises:

providing to the user a mobile phone cashless monetary transaction activation link at a computing device;

registering a phone number of the mobile phone of the user via the activation link;

transmitting the registered phone number of the mobile phone to the STS;

generating an executable mobile payment software that includes the software authentication parameter, as the authentic mobile payment software; and generating the PIE correlated in the STS with the authentic mobile payment software, and wherein an installation of the authentic mobile payment software download link comprises:

transmitting, by the STS, via short/multimedia message service using the registered mobile phone number, a download link to the authentic mobile payment software to the mobile phone of the user;

downloading to the mobile phone the authentic mobile payment software via the download link, thereby performing the installing of the authentic mobile payment software; and providing, by the STS, the PIE to the user.

8. The method of claim 1, further comprising:

correlating, by the STS, abstracted registered financial entities information of the user with the authentic mobile payment software;

binding, by the mobile phone, the authentic mobile payment software with transaction information of a transaction party by accessing over the mobile phone network software application of the transaction party;

presenting, by the STS, via transmitting to the mobile phone, a selectable list of abstracted identifiers corresponding to the registered financial entities of the user correlated with the authentic mobile payment software; and executing, by the mobile phone, the mobile phone cashless monetary transaction with the transaction party according to exchange of encrypted transaction messages with the STS that comprise an identifier of the mobile phone, an identifier of the transaction party, and an identifier of the transaction, and proceeding with payment from the financial entities of the user.

9. The method of claim 6, wherein the UPTF SAS comprises generating, by the mobile phone, a first view of the mobile phone cashless monetary transaction, and transmitting the first view of the transaction to the STS according to the SAS;

generating, independently by a party to the transaction, a second view of the transaction, and transmitting the second view of the transaction to the STS according to the SAS; and verifying, by the STS, the first and second views to authenticate the transaction, and causing, by the STS, execution of the transaction based upon the verifying.

10. The method of claim 9, wherein the first and second views are symmetrical and the SAS comprises generating as each independent view of the transaction an unencrypted perceptible part comprising an identification of a first mobile phone for the first view and a current timestamp, and an encrypted part by encrypting with the changing encryption key a transaction message that comprises data of the transaction, the identification of the first mobile phone and an identification of a second device for the second view.

11. The method of claim 9, wherein the first and second views are symmetrical and the SAS comprises:

generating as each independent view of the transaction, an unencrypted perceptible part comprising an identification of a first mobile phone for the first view and a current timestamp, and an encrypted part by encrypting with the changing encryption key a transaction message that comprises data of the transaction, the identification of the first mobile phone and an identification of a second device for the second view.

12. The method of claim 1, wherein the generating of the encryption key further comprises:

generating a current time stamp;

determining a time difference value between the current time stamp and the initialization time stamp;

computing a Keyed-Hashing for Message Authentication (HMAC) result, based upon the initialization random seed number and/or the time difference value, to generate the transaction random sequence number;

selecting a number of bits from the HMAC result as the transaction random sequence number and combining the selected number of bits with the PIE;

computing a hash value of the combination; and selecting a number of bits of the hash value to generate the encryption key.

13. The method of claim 12, wherein the number of bits selected is 128.

14. The method of claim 4, wherein an online payment system provides the mobile phone cashless monetary transaction activation link to a member of the online payment system as the user, thereby providing person-to-person mobile phone authenticable cashless monetary transactions using the user's mobile phone wireless wallet.

15. The method of claim 14, further comprising:

displaying on the mobile phone of the user a graphical user interface presenting selectable menu items comprising person-to-person payment, person-to-person transaction, a pending payment request by another person, setup, or any combination thereof;

upon selection of the person-to-person payment or the pending payment request menu items, displaying a graphical user interface accepting inputs comprising a mobile phone number, an email address or any combination thereof, of a transaction party; and upon input of a mobile phone number and/or an email address of the transaction party, and the PIE, executing the mobile phone cashless monetary transaction with the transaction party using the mobile phone wireless wallet of the mobile phone user.

16. The method of claim 15, wherein the accepting inputs further comprises accepting abstracted previously registered financial account reference identifiers of the mobile phone user to execute the transaction.

17. The method of claim 1, wherein the mobile phone authenticable cashless monetary transaction is performed according to Universal Pervasive Transaction Framework Secure Agreement Submission (UPTF SAS) protocol, and the method further comprises:

correlating, at the STS, abstracted financial entity information of the user with the authentic mobile payment software; and providing person-to-person mobile phone UPTF authenticable cashless monetary transactions using the user mobile phone wireless wallet.

18. The method of claim 1, wherein the PIE is an alphanumeric string having less than or equal to 5 characters.

19. The method of claim 6, further comprising transmitting the mobile phone authenticable cashless transaction messages over a mobile phone communications network according to Hypertext Transfer Protocol (HTTP), socket based communication, and/or web service calls.

20. The method of claim 8, wherein the executing of the mobile phone cashless monetary transaction further comprises:

receiving a mobile phone display screen displayable barcode image as a receipt of the executed mobile phone cashless monetary transaction and/or other transaction, receipt related information;

displaying the barcode image on a display screen of the mobile phone; and reading, at a physical point of service of the transaction party, the displayed barcode image for transaction management by the transaction party.

21. The method of claim 17, wherein the person-to-person mobile phone UPTF authenticable cashless monetary transactions comprise sending a payment to a person, requesting a payment from another person, checking a pending request for payment from another, storing and retrieving records of transactions, or any combination thereof.

22. The method of claim 1, wherein the installing of the authentic mobile payment software in the mobile phone comprises downloading the authentic mobile payment software to the mobile phone, storing the authentic mobile payment software on a mobile phone installable computer readable medium, storing the authentic mobile payment software in a mobile phone embedded computer readable medium, or any combination thereof.

23. The method of claim 7, wherein the providing of the PIE to the user comprises delivering the PIE to the user as an image through a third party.

24. The method of claim 20, further comprising storing in the mobile phone the barcode image transaction receipt.

25. The method of claim 1, further comprising rewarding a mobile phone wireless wallet transaction with an automatic download of a mobile phone content comprising a ringtone, a game, a digital/media content, software, or any combination thereof, and/or a credit towards any thereof.

26. The method of claim 21, further comprising notifying the user at the mobile phone of a status of the mobile phone UPTF authenticable cashless monetary transaction using Short/Multimedia Message Service, email, and/or voice message.

27. The method of claim 20, further comprising notifying the user at the mobile phone of a status of the mobile phone UPTF authenticable cashless monetary transaction using Short/Multimedia Message Service, email, and/or voice message, including transaction receipt information.

28. The method of claim 17, wherein the PIE is an alphanumeric string having less than or equal to 5 characters.

29. A mobile phone communicably connectable to a secured transaction server (STS) and comprising:

a computer processor and a computer readable medium storing executable instructions that when executed by the computer processor cause the computer processor to perform:

storing a mobile payment software initialized at the secured transaction server (STS) with a software authentication parameter including one or more of an initialization time stamp and/or initialization random seed number and correlated with a personal identification entry (PIE), as an authentic mobile payment software, prompting a user to input the PIE, receiving the PIE and generating, according to both the received PIE and the software authentication parameter, a changing encryption key that changes for each transaction message by generating a transaction random sequence number based upon the software authentication parameter of the authentic payment software and generating the changing encryption key based upon both the transaction random sequence number generated based upon the software authentication parameter and the received PIE, encrypting a transaction message for an authenticable mobile phone cashless monetary transaction, transmitting the encrypted transaction message, which is decryptable and authenticable by the STS by generating the changing encryption key based upon the PIE correlated with the authentic mobile payment software, to the STS.

30. A computer system, comprising:

a computer server and a computer readable medium storing executable instructions that when executed by the server cause the server to perform:

initializing a mobile payment software with a software authentication parameter including one or more of an initialization time stamp and/or initialization random seed number, to provide an authentic mobile payment software, generating a secured personal identification entry (PIE);

providing a secured correlation between the PIE and the authentic mobile payment software, and providing an online purchasing interface; and a mobile phone in mobile phone network communication with the server and comprising:

a computer processor, and a computer readable medium storing the authentic mobile payment software comprising computer readable instructions that when executed by the computer processor cause the computer processor to perform:

interfacing with the online purchasing interface to generate a virtual shopping cart, prompting a user to input the PIE, receiving the PIE and generating, according to both the received PIE and the software authentication parameter, a changing encryption key that changes for each transaction message by generating a transaction random sequence number based upon the software authentication parameter of the authentic payment software and generating the changing encryption key based upon both the transaction random sequence number generated based upon the software authentication parameter and the received PIE, encrypting a transaction message for an authenticable mobile phone cashless monetary transaction based upon the virtual shopping cart, and transmitting over the mobile phone network the encrypted transaction message to the computer server to execute the transaction, wherein the computer server decrypts the encrypted transaction message by generating the changing encryption key based upon the PIE correlated with the authentic mobile payment software and authenticates the mobile phone cashless monetary transaction according to the decrypted transaction message.

* * * * *

UNITED STATES PATENT AND TRADEMARK OFFICE

CERTIFICATE OF CORRECTION

PATENT NO. : 7,822,688 B2
APPLICATION NO. : 11/045484
DATED : October 26, 2010
INVENTOR(S) : Yannis Labrou et al.

It is certified that error appears in the above-identified patent and that said Letters Patent is hereby corrected as shown below:

Column 31, Line 53 in Claim 9, after "comprises" insert -- : --.

Column 34, Lines 64-67 in Claim 30,
delete "transmitting over the mobile phone network the encrypted
transaction message to the computer server to execute the transaction," and insert
-- transmitting over the mobile phone network the encrypted transaction message to the
computer server to execute the transaction, --. therefor.

Signed and Sealed this
Thirty-first Day of January, 2012

David J. Kappos

*Director of the United States Patent and Trademark Office*